(12) United States Patent
Dalberg et al.

(10) Patent No.: US 11,772,954 B2
(45) Date of Patent: Oct. 3, 2023

(54) BACKFLOW DETECTION AND MIXING MODULE WITH A THERMAL MASS FLOW METER

(71) Applicant: THE COCA-COLA COMPANY, Atlanta, GA (US)

(72) Inventors: James Dalberg, Atlanta, GA (US); Jevawn Sebastian Roberts, Tucker, GA (US); Brian B. Johnson, Roswell, GA (US)

(73) Assignee: The Coca-Cola Company, Atlanta, GA (US)

(*) Notice: Subject to any disclaimer, the term of this patent is extended or adjusted under 35 U.S.C. 154(b) by 0 days.

(21) Appl. No.: 18/126,099

(22) Filed: Mar. 24, 2023

(65) Prior Publication Data
US 2023/0234829 A1 Jul. 27, 2023

Related U.S. Application Data

(63) Continuation of application No. 17/416,242, filed as application No. PCT/US2019/067871 on Dec. 20, 2019, now Pat. No. 11,613,457.
(Continued)

(51) Int. Cl.
B67D 1/12 (2006.01)
B67D 1/00 (2006.01)
B67D 1/08 (2006.01)

(52) U.S. Cl.
CPC ........... B67D 1/125 (2013.01); B67D 1/0069 (2013.01); B67D 1/0888 (2013.01)

(58) Field of Classification Search
CPC .... B67D 1/125; B67D 1/0069; B67D 1/0888; B67D 1/0021; B67D 2001/0093;
(Continued)

(56) References Cited

U.S. PATENT DOCUMENTS 1,043,127 A * 11/1912 Meuller ............... B01F 23/2362
261/DIG. 7
1,087,436 A * 2/1914 Cordley .............. B01F 23/2362
261/153
(Continued)

FOREIGN PATENT DOCUMENTS

GB 2483073 A 2/2012
JP H07190237 A 7/1995
(Continued)

OTHER PUBLICATIONS

International Search Report and Written Opinion. Issued by the International Searching Authority (ISA/KR) in PCT Application No. PCT/US2019/067871 dated Apr. 14, 2020, 12 pages.
(Continued)

Primary Examiner — Donnell A Long
(74) Attorney, Agent, or Firm — Meunier Carlin & Curfman LLC

(57) ABSTRACT

A carbonated water dispenser comprises a carbonator with a water inlet and a carbonated water outlet. A backflow preventer module is fluidically coupled to the water inlet and comprises a check valve and a thermal mass flow meter. The thermal mass flow meter is configured to communicate a first signal based on a measured amount of heat transferred from a heater to a temperature sensor by a flow of a fluid through the backflow preventer module. A shut-off valve is fluidically coupled between the carbonated water outlet and a nozzle. The shut-off valve is configured to allow or prevent fluid flow from the carbonated water outlet to the nozzle base on a control signal. A controller is configured to detect a backflow condition based on the first signal and generate the control signal to configure the shut-off valve to prevent dispensing carbonated water upon detection of the backflow condition.

20 Claims, 11 Drawing Sheets

Related U.S. Application Data

(60) Provisional application No. 62/783,113, filed on Dec. 20, 2018.

(58) Field of Classification Search
CPC .............. B01F 23/2362; B01F 35/2111; G01F 1/6845; G01F 1/72; G01F 1/74; G01F 15/005
See application file for complete search history.

(56) References Cited

U.S. PATENT DOCUMENTS

| | | | | |
|---|---|---|---|---|
| 1,929,948 | A | * | 10/1933 | Kantor ................ B01F 23/2363 261/DIG. 7 |
| 2,404,679 | A | * | 7/1946 | Andron ............... B01F 35/2112 261/DIG. 7 |
| 2,604,310 | A | * | 7/1952 | Brown .................... B01F 35/71 261/DIG. 7 |
| 3,240,395 | A | * | 3/1966 | Carver ................. B67D 1/0021 261/DIG. 7 |
| 3,259,273 | A | * | 7/1966 | Kromer ................ B67D 1/0073 261/DIG. 7 |
| 5,117,863 | A | | 6/1992 | McGarrah |
| 7,077,290 | B2 | | 7/2006 | Bethuy et al. |
| 7,077,293 | B2 | | 7/2006 | McCann et al. |
| 7,578,415 | B2 | | 8/2009 | Ziesel et al. |
| 7,866,509 | B2 | | 1/2011 | Ziesel |
| 2002/0060226 | A1 | | 5/2002 | Kameyama |
| 2003/0121937 | A1 | | 7/2003 | Black et al. |
| 2006/0279007 | A1 | | 12/2006 | Sakakibara et al. |
| 2007/0212468 | A1 | | 9/2007 | White et al. |
| 2009/0194564 | A1 | | 8/2009 | Tsubouchi et al. |
| 2010/0326562 | A1 | | 12/2010 | Sheehy et al. |
| 2011/0308328 | A1 | | 12/2011 | Haartsen et al. |
| 2014/0263454 | A1 | | 9/2014 | Connerat et al. |
| 2015/0082243 | A1 | | 3/2015 | Taylor et al. |
| 2016/0318748 | A1 | | 11/2016 | Ryan et al. |
| 2017/0088410 | A1 | | 3/2017 | Wing et al. |
| 2017/0369298 | A1 | | 12/2017 | Walton |
| 2018/0162710 | A1 | | 6/2018 | Moore et al. |

FOREIGN PATENT DOCUMENTS

| | | |
|---|---|---|
| WO | 2015/103542 A1 | 7/2015 |
| WO | 2015/167846 A1 | 11/2015 |
| WO | 2018/160972 A1 | 9/2018 |
| WO | 2020/051409 A1 | 3/2020 |

OTHER PUBLICATIONS

Vraanes, Maarten et al. Integrated Device Technology, Inc. Thermal Mass Flow Sensors for Gas and Liquid Applications. Nov. 15, 2017. 5 pages.

Extended European Search Report issued in EP 19899501.1, dated Aug. 17, 2022.

English Summary of Chinese Office Action issued in CN2019800850098, dated Dec. 5, 2022.

* cited by examiner

BACKFLOW DETECTION AND MIXING MODULE WITH A THERMAL MASS FLOW METER

CROSS-REFERENCE TO RELATED APPLICATIONS

This application claims the benefit of U.S. Provisional Application Ser. No. 62/783,113 filed Dec. 20, 2018, the disclosure of which is expressly incorporated herein by reference.

FIELD OF THE INVENTION

This invention generally relates to backflow detection, and more particularly to backflow detection with a thermal mass flow meter and check valve on a carbonator. This invention also generally relates to a mixing module, and more particularly to a mixing module with a thermal mass flow meter and controllable mixing valves.

BACKGROUND OF THE INVENTION

A backflow preventer on a carbonator ensures that pressurized carbonated water is not allowed to flow from the carbonator into the water supply where the carbonated water may come into contact with copper plumbing. Upon carbonated water coming into contact with copper plumbing, the copper may dissolve into the water at sufficient concentrations to cause acute gastrointestinal distress in anyone that consumes the water. Typically, backflow prevention is provided by a dual check valve with a vent in between each of the check valves. While effective, it is still possible for a dual check valve to fail.

BRIEF SUMMARY OF THE INVENTION

In a first aspect of the disclosure, a backflow preventer module comprises a housing having an inlet and an outlet and a passageway extending between the inlet and the outlet. The passageway defining a flow path through the backflow preventer module. The backflow preventer module further comprises a thermal mass flow meter, the thermal mass flow meter located between the inlet and the outlet along the flow path. The thermal mass flow meter is configured to communicate a first signal based on a flow rate of a fluid along the flow path. The backflow preventer module further comprises a check valve located between the inlet and the outlet along the flow path and configured to prevent a flow of fluid in a direction from the outlet to the inlet.

In some implementations of the first aspect of the disclosure, the backflow preventer module further comprises a second check valve located between the inlet and the outlet along the flow path and configured to prevent a flow of fluid in the direction from the outlet to the inlet.

In some implementations of the first aspect of the disclosure, the thermal mass flow meter is further configured to communicate a second signal based on a measured temperature of the fluid.

In some implementations of the first aspect of the disclosure, the thermal mass flow meter comprises a heater and a temperature sensor located at a distance from the heater toward the inlet or the outlet.

In some implementations of the first aspect of the disclosure, the thermal mass flow meter further comprises a second temperature sensor located at the distance from the heater toward the other of the inlet or the outlet.

In some implementations of the first aspect of the disclosure, the thermal mass flow meter is configured to generate the first signal based on a measured amount of heat transferred from the heater to the temperature sensor.

In some implementations of the first aspect of the disclosure, the first signal is a voltage or current value of the measured amount of heat transferred or a flow rate value determined by the thermal mass flow meter based on the measured amount of heat transferred.

In some implementations of the first aspect of the disclosure, the temperature sensor comprises a thermocouple, a thermopile, or thermistor.

In a second aspect of the disclosure, a carbonated water dispenser comprises a carbonator comprising a water inlet and a carbonated water outlet. The carbonated water dispenser also comprises a backflow preventer module fluidically coupled to the water inlet. The backflow preventer comprises a check valve and a thermal mass flow meter configured to communicate a first signal based on a measured amount of heat transferred from a heater to a temperature sensor by a flow of a fluid through the backflow preventer module. The carbonated water dispenser comprises a nozzle fluidically coupled to the carbonated water outlet. The carbonated water dispenser comprises a shut-off valve fluidically coupled between the carbonated water outlet and the nozzle. The shut-off valve configured to receive a first control signal to configure the shut-off valve in an open position and configured to receive a second control signal to configure the shut-off valve in a closed position. The shut-off valve is configured to allow carbonated water to flow from the carbonated water outlet to the nozzle in the open position and prevent the carbonated water from flowing from the carbonated water outlet to the nozzle in the closed position. The carbonated water dispenser comprises a controller electrically coupled to the backflow preventer module and configured to receive the first signal and detect a backflow condition based on the first signal. The controller is further electrically coupled to the shut-off valve and configured to communicate the second control signal upon detection of the backflow condition.

In some implementations of the second aspect of the disclosure, the controller is configured to detect the backflow condition upon determining that the first control signal is indicative of the fluid through the backflow preventer module is in a direction away from the water inlet.

In some implementations of the second aspect of the disclosure, the controller is configured to detect the backflow condition upon determining that the first control signal is indicative of the fluid through the backflow preventer module is at a temperature below a threshold temperature.

In some implementations of the second aspect of the disclosure, the controller is configured to detect the backflow condition upon detecting a threshold number of bubbles or a threshold amount of gas within a given period of time.

In some implementations of the second aspect of the disclosure, the carbonator further comprises a carbon dioxide inlet. The carbonated water dispenser further comprises a second backflow preventer module fluidically coupled to the carbon dioxide inlet. The second backflow preventer comprising a second check valve and a second thermal mass flow meter configured to communicate a second signal based on a measured amount of heat transferred from a second heater to a second temperature sensor by a second flow of a fluid through the second backflow preventer module. The controller is electrically coupled to the second backflow preventer module and configured to receive the second signal and detect a second backflow condition based on the second signal. The controller is configured to communicate the second control signal upon detection of the second backflow condition.

In some implementations of the second aspect of the disclosure, the first signal is a voltage or current value of the measured amount of heat transferred or a flow rate, temperature, or bubble value determined by the thermal mass flow meter based on the measured amount of heat transferred.

In some implementations of the second aspect of the disclosure, the temperature sensor comprises a thermocouple, a thermopile, or thermistor.

In a third aspect of the disclosure, a mixing valve system comprises a first fluid inlet adapted to receive a first fluid flow. The mixing valve system also comprises a first proportional control valve fluidically coupled to the first fluid inlet and adapted to dynamically adjust an amount or flow rate of the first fluid flow provided from the first proportional control valve based on a first control signal. The mixing valve system also comprises a second fluid inlet adapted to receive a second fluid flow. The mixing valve system also comprises a second proportional control valve fluidically coupled to the second fluid inlet and adapted to dynamically adjust an amount or flow rate of the second fluid flow provided from the second proportional control valve based on a second control signal. The mixing valve system also comprises a nozzle fluidically coupled to the first and second proportional control valves and adapted to dispense a combined fluid flow comprising the first fluid flow provided from the first proportional control valve and the second fluid flow provided from the second proportional control valve. The mixing valve system also comprises a thermal mass flow meter configured to communicate a first feedback signal based on a measured parameter of one of the first fluid flow, the second fluid flow, or the combined fluid flow. The mixing valve system also comprises a controller electrically coupled to the thermal mass flow meter and the first and second proportional control valves, wherein the controller is configured to generate the first and second control signals based on the first feedback signal.

In some implementations of the third aspect of the disclosure, the measured parameter is a temperature or flow rate of the first fluid flow, the second fluid flow, or the combined fluid flow.

In some implementations of the third aspect of the disclosure, the measured parameter is a temperature of the combined fluid flow.

In some implementations of the third aspect of the disclosure, the thermal mass flow meter is configured to communicate the first feedback signal based on the measured parameter of the first fluid flow. The mixing valve system further comprises a second thermal mass flow meter configured to communicate a second feedback signal based on the measured parameter of the second fluid flow.

In some implementations of the third aspect of the disclosure, the mixing valve system further comprising a manifold fluidically coupled to the first and second proportional control valves to receive the first and second fluid flows. The manifold is further fluidically coupled to the nozzle to supply the combined fluid flow.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
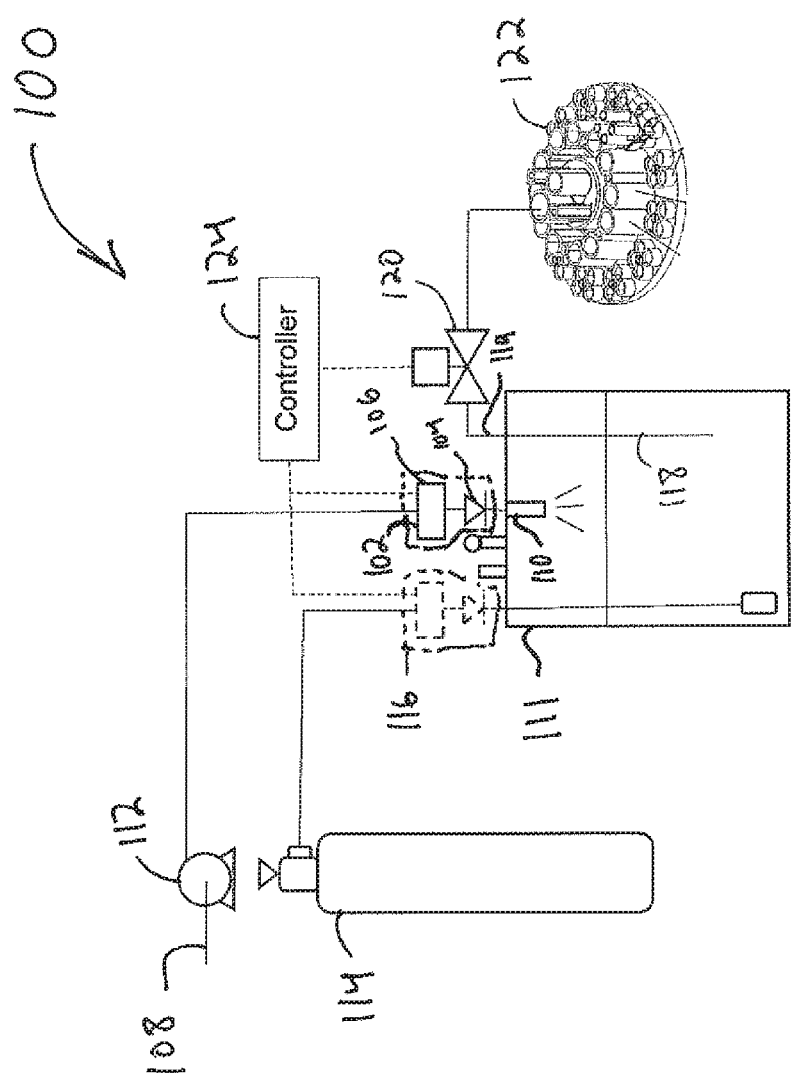
FIG. 1 is a block diagram of a carbonation system according to the teachings herein.

Turning now to the illustrations, FIG. 1 illustrates an embodiment of a backflow preventer module for a carbonator according to the teachings herein. The backflow preventer module comprises a check valve and a microelectromechanical systems (MEMS) thermal mass flow meter. In contrast to passive prevention devices such as typical dual check valve backflow preventers, the MEMS thermal mass flow meter is configured to actively detect a backflow condition and is further configured to detect the presence of bubbles in a liquid line. Upon detecting a backflow condition or detecting the presence of bubbles in a liquid line, a carbonator controller may generate an alert of the backflow condition and prevent further dispensing of carbonated water from the carbonator until the unit has been serviced.

Turning now to FIG. 1, an embodiment of a carbonation system 100 incorporating the above introduced backflow preventer module 102 is illustrated. The backflow preventer module 102 includes a check valve 104 and a thermal mass flow meter 106. The backflow preventer module 102 is positioned between a water source 108, such as a municipal water supply, and a water inlet 110 of a carbonator 111. A carbonator pump 112 may be positioned between the water source 108 and the water inlet 110 for supplying a pressurized supply of water to the carbonator 111. A $CO_2$ source 114 supplies the carbonator 111 with a pressurized supply of carbon dioxide. One or more pressure regulators (not shown) may be positioned between the $CO_2$ source 114 and the carbonator 111. The carbonator 111 may additionally include other typical carbonator components such as a pressure relief valve, pressure gauge, diffuser, and the like.

The thermal mass flow meter 106 in the backflow preventer module 102 is disposed along the flow path between the water source 108 and the water inlet 110 of the carbonator 111. In some implementations, the thermal mass flow meter 106 is a microelectromechanical systems (MEMS) thermal mass flow meter. The thermal mass flow meter 106 is configured to measure a flow rate of fluid passing through the flow path as well as a temperature of the fluid. Based on the measured flow rate of fluid, a backflow condition may be detected (e.g., upon detecting a flow of fluid in a direction from the water inlet 110 to the water source 108). In various implementations, the thermal mass flow meter 106 is configured to meter liquids, including water or carbonated water, with a temperature range between 1 degrees Celsius to 32 degrees Celsius and a pressure between 0-225 psi.

In some implementations, a second backflow preventer module 116 is provided on the carbonator 111 at the carbon dioxide inlet. The second backflow preventer module 116 is configured substantially the same as the backflow preventer module 102 described above. At the carbon dioxide inlet to the carbonator 111, the second backflow preventer module 116 prevents backflow conditions into the carbon dioxide supply circuit (e.g., upon detecting a flow of fluid in a direction from the carbon dioxide inlet of the carbonator 111 to the $CO_2$ source 114). The second backflow preventer module 116 also measures a flow rate of carbon dioxide into the carbonator 111 and may trigger a depleted $CO_2$ source alert for changing out the $CO_2$ source 114 upon a detected flow rate being less than a threshold flow rate.

A dip tube 118 supplies carbonated water from the carbonator 111 to a carbonator outlet 119. A shut-off valve 120 is coupled between the carbonator outlet 119 and a nozzle 122 for controlling when carbonated water is dispensed from the nozzle. A controller 124 is coupled to the shut-off valve 120 for controlling operation thereof. For example, the shut-off valve 120 may have an open configuration for allowing a flow of carbonated water to pass from the carbonator outlet 119 to the nozzle 122. Likewise, the shut-off valve 120 may have a closed configuration for preventing a flow of carbonated water from passing from the carbonator outlet 119 to the nozzle 122.

One or more metering devices (not shown) may additionally be positioned along the flow path from the carbonator outlet 119 to the nozzle 122 for metering an amount of carbonated water dispensed from the nozzle 122. In some implementations, the metering device(s) may be a static or dynamic mechanical flow control valve and provided as a separate component from the shut-off valve 120 or integrated into a flow control module with the shut-off valve 120. In some implementations, the shut-off valve 120 may be implemented as part of a flow control module as described in U.S. Prov. App. No. 62/727,702, filed Sep. 6, 2018, entitled, "Flow Control Module With A Thermal Mass Flow Meter," or as described in as described in PCT App. No. PCT/US18/20673, filed Mar. 2, 2018, entitled "Flow Control Module," both of which are hereby incorporated by reference in their entirety.

The controller 124 is also coupled to the thermal mass flow meter 106 of the backflow preventer module 102 and coupled to the thermal mass flow meter of the second backflow preventer module 116, when present. The controller 124 is configured to receive measurement signals from the thermal mass flow meter(s) and control operation of the carbonation system 100 accordingly. For example, upon detecting a backflow condition in either of the carbon dioxide supply circuit or water supply circuit to the carbonator 111, the controller 124 may control the shut-off valve 120 to prevent dispensing carbonated water until the carbonation system 100 has been serviced. Upon detecting a backflow condition, the controller 124 may also generate one or more alerts for signaling to consumers, crew, and/or service technicians that a backflow condition has been detected or otherwise indicate that service of the carbonation system 100 is required. The alert may be stored locally in an error log or communicated remotely to a server (not shown) for alerting service technicians.

The thermal conductivity of air compared to most liquids is drastically different. For example, the thermal conductivity of air at 75° F. and 14.5 psia is 26.16 mW/m K whereas the thermal conductivity of water in the same conditions is 598.03 mW/m K. The thermal conductivity of other gases and liquids will vary, but most will maintain approximately an order of magnitude difference in thermal conductivity. Accordingly, the thermal mass flow meter 106 may also be leveraged to detect bubbles in the liquid water supply line or to detect liquid in the carbon dioxide gas supply line to the carbonator 111.

For example, the output of the thermal mass flow meter 106 while a liquid, such as water, is flowing past the thermal mass flow meter 106 may be in a range of between 0.25 to 0.35 volts. In contrast, the output of the thermal mass flow meter 106 while a gas, such as carbon dioxide, is flowing past the thermal mass flow meter may be in a range between 0.02 to 0.03 volts. Other voltage values may be measured based on the configuration of the thermal mass flow meter 106. Accordingly, the output of the thermal mass flow meter 106 provides a dramatically different voltage level while the gas is flowing past the thermal mass flow meter 106, at least an order of magnitude lower than that when a liquid is flowing. This difference in the output of the thermal mass flow meter 106 is caused by the decrease in thermal transfer caused by the decrease in thermal conductivity of gases in comparison to liquids.

A threshold value at an intermediate value between the anticipated outputs for liquids and gasses may be specified for detecting the transition between a liquid and a gas flowing past the thermal mass flow meter 106. For example, the threshold value may be set to two, three, four, five, or more times the anticipated output value for a gas. In one example, the threshold value is set to a value of 0.1 volts.

While the example above is provided with respect to a voltage signal provided from the thermal mass flow meter 106, a value of the measured flow rate (e.g., 4 fl. oz. per second) determined by the thermal mass flow meter 106 may likewise be used. For example, dramatically different flow rate values may be determined by the thermal mass flow meter 106 based on whether a liquid or a gas may be present.

Accordingly, the controller 124 is additionally configured to detect bubbles based on the output of the thermal mass flow meter 106. That is, in addition to detecting the flow rate and temperature of a fluid, the thermal mass flow meter 106 acts as a bubble sensor to detect the presence of bubbles in a liquid flow. Upon the output of the thermal mass flow meter 106 being less than the threshold value, the controller 124 may determine that a gas is present.

In some implementations, a gas is determined to be present by the controller 124 after the output of the thermal mass flow meter 106 is below the threshold value for more than a threshold amount of time. For example, the threshold amount of time may be more than 0.01 seconds, more than 0.05 seconds, or more than 0.1 seconds. By additionally applying a threshold amount of time to the determination of whether a gas is present, transient signals or noise may be prevented from incorrectly detecting the presence of gas.

While an occasional bubble may be expected in normal operation, persistent detection of bubbles or the absence of a liquid altogether may be used as a flag for generating a maintenance alert. Accordingly, the controller 124 is configured to detect a threshold number of bubbles within a predetermined period of time based on the output of the thermal mass flow meter 106. For example, in the water supply line to the carbonator 111, the presence of more than a threshold number of bubbles within a given period of time or upon detecting more than a threshold amount of gas within a predetermined period of time may be indicative of a leak of carbon dioxide from the carbonator 111 into the water supply line.

While the example is provided above for detecting bubbles in a liquid line, the thermal mass flow meter in the second backflow preventer 116 may likewise be used to detect liquid in the carbon dioxide gas supply line.

To facilitate detecting the presence of bubbles at the thermal mass flow meter 106, the backflow preventer module 102 may be installed in a horizontal orientation with the thermal mass flow meter 106 positioned on a top of a flow path through the backflow preventer module 102. In this orientations, bubbles are induced to flow past the thermal mass flow meter 106 to ensure their detection. Likewise, to facilitate detecting the presence of liquid in a gas line, the second backflow preventer module 116 may be installed in a horizontal orientation with the thermal mass flow meter of the second backflow preventer module 116 positioned on a bottom of a flow path through the second backflow preventer module 116. In this orientation, liquid is induced to flow past the thermal mass flow meter to ensure its detection. Other installation orientations are contemplated by this disclosure.

Figure 2:
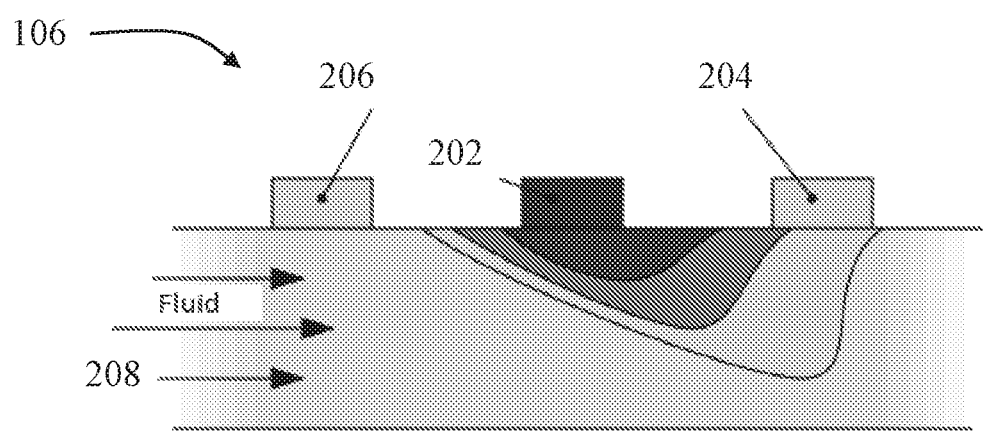
FIG. 2 is a cross-sectional view of a thermal mass flow meter in the carbonation system according to FIG. 1.

FIG. 2 is a cross-sectional view of the thermal mass flow meter 106 according to FIG. 1. The thermal mass flow meter 106 includes a heater 202, a downstream temperature sensor 204, and an upstream thermal sensor 206. The heater 202 is configured to introduce a known amount of heat into a fluid 208 flowing past the heater 202. In various implementations, the heater 202 is configured to introduce an amount of heat into the fluid to cause a temperature change in the fluid of less than 0.3 degrees Celsius. The upstream temperature sensor 206 and the downstream temperature sensor 204 are each configured to sense a temperature of the fluid 208 at their relative locations and provide a voltage or current output based on the sensed temperature of the fluid 208. For example, the downstream temperature sensor 204 is configured to provide a voltage or current output based upon the sensed temperature of the fluid 208 at a first location located towards an outlet of the backflow preventer module 102 relative to the heater 202. The upstream temperature sensor 206 is configured to provide a voltage or current output based upon the sensed temperature of the fluid 208 at a second location located towards an inlet of the backflow preventer module 102 relative to the heater 202.

The upstream temperature sensor 206 may be positioned at a distance from the heater 202 that is equal to a distance between the heater and the downstream temperature sensor 204. The temperature sensors 204, 206 may be thermocouples, thermopiles, thermistors, and the like. In various implementations, the temperature sensors 204, 206 may be different types of temperature sensors or the same type of temperature sensor. Each of the heater 202, the downstream temperature sensor 204, and the upstream temperature sensor 206 are configured to be in fluid contact with the fluid 208. A seal (not shown) may be provided between the thermal mass flow meter 106 and a housing of the backflow preventer module 102. The seal may be positioned around the fluid contact locations of the thermal mass flow meter 106, including the heater 202 and the temperature sensors 204, 206.

In various implementations, the temperature sensor 204 produces a voltage or current output based upon a relative difference between a surface of the temperature sensor 204 which is in fluid contact with the fluid 208 and an opposite surface of the temperature sensor 204. Likewise, the temperature sensor 206 produces a voltage or current output based upon a relative difference between a surface of the temperature sensor 206 which is in fluid contact with the fluid 208 and an opposite surface of the temperature sensor 206. A difference in the output from the temperature sensors 204, 206 is indicative of a temperature difference between the fluid 208 at the first and second locations. The difference in the output of the temperature sensors 204, 206 is therefore proportional to the amount of heat transferred from the heater 202 to the downstream temperature sensor 204 and thus proportional to the flow rate of the fluid 208.

In various implementations, the temperature sensors 204, 206 produce an output voltage or current indicative of the temperature of the fluid 208 itself (as opposed to a differential or relative temperature measurement described above). The output voltage or current from the temperature sensors 204, 206 may be directly correlated to the actual temperature of the fluid 208, such as through one or more temperature tables or transforms that correlate the output voltage or current to the temperature of the fluid 208. Different fluids 208 may have different thermal transfer characteristics and thus may have different associated temperature tables or transforms. For example, the temperature sensors 204, 206 may output a first voltage for a first temperature of a first fluid and may likewise output the first voltage for a second temperature of a second fluid that is different. In other words, the temperature sensors 204, 206 may output different voltages upon measuring the same temperature in different fluids.

In various implementations, the upstream temperature sensor 206 may be omitted. The downstream temperature sensor 204 may be used for measuring the flow rate of the fluid 208 when the heater 202 is on and for measuring a temperature of the fluid 208 when the heater 202 is off. In such an implementation, the heater 202 may be periodically cycled to be turned on to measure the flow rate of the fluid 208 and turned off to measure the temperature of the fluid 208.

Regardless of the specific implementation, the temperature sensors 204, 206 are configured to measure both a temperature of the fluid 208 as well as measure a flow rate of the fluid 208 (e.g., through a measurement of heat transfer from the heater 202 to the downstream temperature sensor 204).

Figure 3:
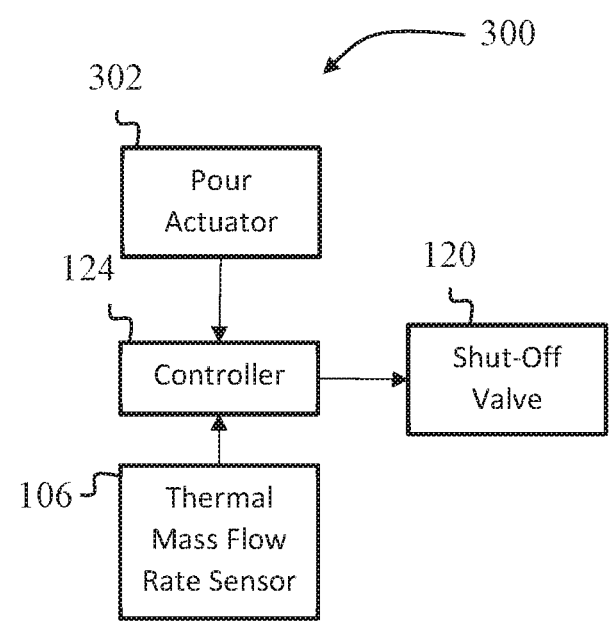
FIG. 3 is a block diagram of a control system including a controller for controlling the carbonation system according to FIG. 1.

FIG. 3 is a block diagram of a control system 300 including the controller 124 for controlling the carbonation system 100 according to FIG. 1. A pour actuator 302 provides an "on" signal to the controller 124 upon being actuated. For example, in a beverage dispenser, the pour actuator 302 may be a dispense button or lever actuated by an end-user of the beverage dispenser to initiate dispensing a carbonated beverage. The pour actuator 302 may be provided by any physical, virtual (e.g., icon in a touchscreen, etc.), or logical (e.g., automatically provided upon satisfying an operating condition) actuation to initiate a flow of the fluid. Upon receiving the "on" signal, the controller 124 is configured to send a control signal to the shut-off valve 120 such that it opens to allow carbonated water to flow from the carbonator 111 to the nozzle 122.

The controller 124 may also control the carbonator pump 112 to supply additional water to the carbonator 111 to replenish the carbonator 111 either as the carbonated water is being dispensed or upon completion of a dispense operation (e.g., upon no longer receiving the "on" signal). The controller 124 also receives a flow rate signal from the thermal mass flow meter 106 indicative of a measured flow rate of water being supplied to the carbonator 111. For example, the flow rate signal may be a value of the measured flow rate determined by the thermal mass flow meter 106 itself or a voltage or current level sensed by the thermal mass flow meter 106. When the flow rate signal is a voltage or current level, the controller 124 uses one or more tables or transforms to convert the voltage or current level to the measured flow rate for the fluid.

Additionally, the controller 124 receives a temperature signal from the thermal mass flow meter 106 indicative of a measured temperature of the fluid through the flow control module 100. For example, the temperature signal may be a value of the measured temperature determined by the thermal mass flow meter 106 itself or a voltage or current level sensed by the thermal mass flow meter 106. When the temperature signal is a voltage or current level, the controller 124 uses one or more tables or transforms to convert the voltage or current level to the measured temperature of the fluid.

Using the flow rate signal or temperature signal from the thermal mass flow meter 106, the controller 124 detects a backflow condition on the water supply line to the carbonator 111. For example, the carbonated water stored in the carbonator 111 may be chilled to a temperature below that of the water supplied from the water source 108. Accordingly, upon detecting a flow rate in a direction away from the carbonator 111 (e.g., measuring heat transfer from the heater 202 to the upstream temperature sensor 206 or not measuring heat transfer from the heater 202 to the downstream temperature sensor 204 when a flow is expected) or upon detecting a temperature below a threshold temperature, the controller 124 may detect a backflow condition on the water supply line to the carbonator 111. Upon detecting the backflow condition, the controller 124 is configured to send a control signal to the shut-off valve 120 such that it closes to prevent carbonated water from flowing from the carbonator 111 to the nozzle 122. The controller 124 may also generate one or more alerts or maintenance logs as discussed above.

Various alternatives to the control system 300 may be made without departing from the spirit or scope of this disclosure. For example, in addition to actively detecting a backflow condition, the thermal mass flow meter 106 may additionally be used in conjunction with the controller 124 as a fill meter for the carbonator 111. For example, based on a known cross-sectional area of a flow path of the backflow preventer module 102 and a precise measurement of flow rate as determined based on the signals from the thermal mass flow meter 106, the controller 124 is able to determine how much water is being supplied to carbonator 111. Based on how long the shut-off valve 120 is operated to be open, the controller 124 may additionally determine how much carbonated water is drawn from the carbonator 111. Additionally, in various implementations, a flow meter (not shown) is positioned between the carbonator 111 and the nozzle 122 which provides precise measurements for an amount of carbonated water drawn from the carbonator 111. Using the amount of water being drawn from the carbonator 111 and the amount of water being supplied to the carbonator 111, the controller 124 may control operation of the carbonator pump 112 to control a fill level of the carbonator 111.

Figure 4:
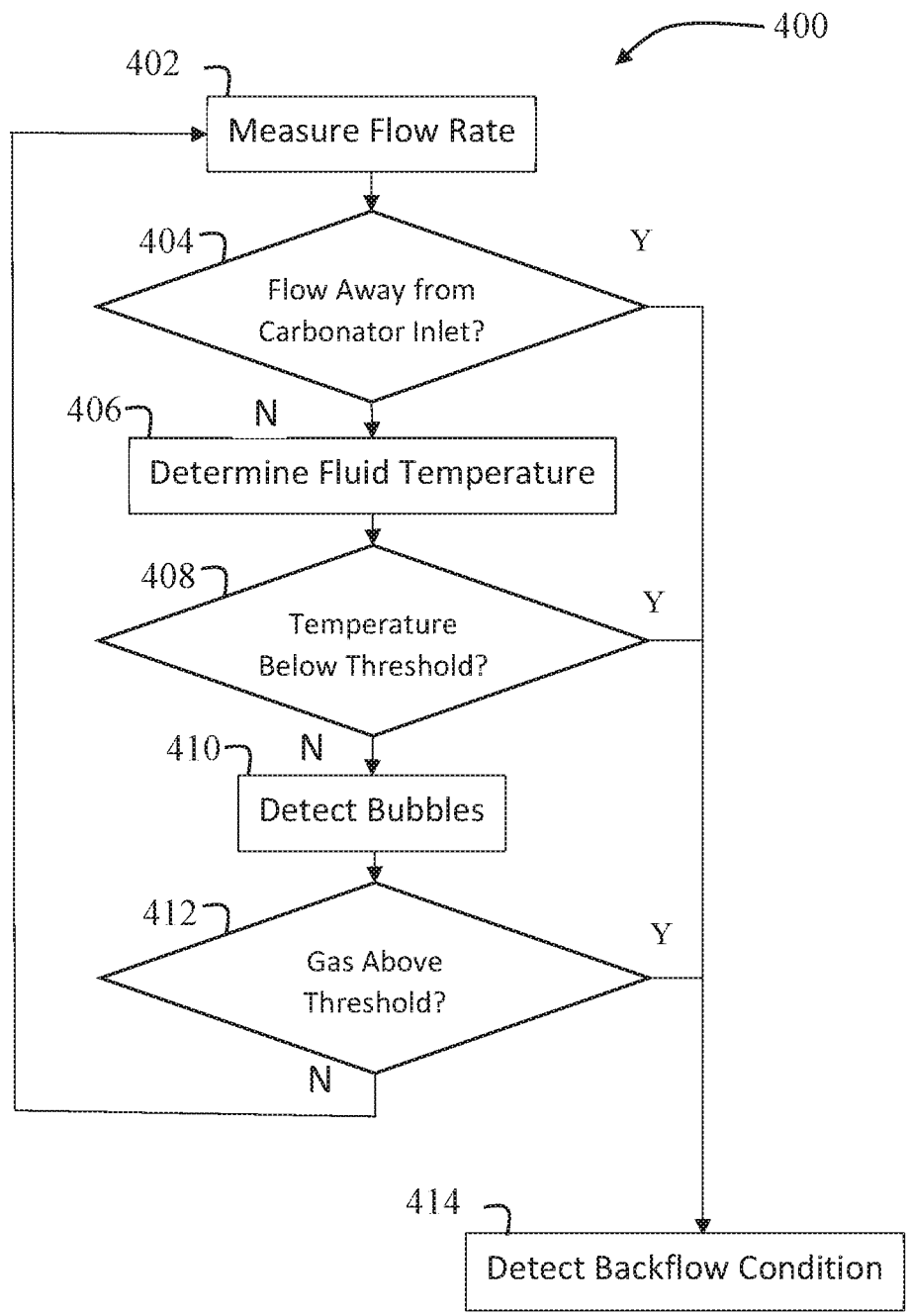
FIG. 4 is a flow diagram of a method of controlling the carbonation system.

FIG. 4 is a flow diagram of a method 400 for the controller to detect a backflow condition based on one or more measurements from the thermal mass flow meter 106. At 402, the controller 124 measures a flow rate of fluid at the water inlet 110 to the carbonator 111 based on one or more signals provided by the thermal mass flow meter 106. For example, the controller 124 receives a measurement of the flow rate of the fluid determined by the thermal mass flow meter 106 or determines the flow rate of the fluid based upon a flow rate signal received from the thermal mass flow meter 106. In various implementations, the controller 124 measures the flow rate when the carbonator pump 112 is not activated. At 404, the controller 124 determines whether the measured flow rate indicates a flow of fluid away from the carbonator 111 towards the water source 108. If yes, then at 414, the controller 124 determines that a backflow condition exists and controls the shut-off valve 120 to prevent further dispensing of carbonated water until the carbonation system 100 has been serviced.

If no, then at 406, the controller 124 measures a temperature of the fluid at the water inlet 110 to the carbonator 111. For example, the controller 124 receives a measurement of the temperature of the fluid determined by the thermal mass flow meter 106 or determines the temperature of the fluid based upon a temperature signal received from the thermal mass flow meter 106. At 408, the controller 124 determines whether the measured temperature is below a threshold temperature. For example, cooled carbonated water from the carbonator 111 may lower the temperature of the water at the water inlet 110 to the carbonator in the event of a backflow condition. If so, then at 414, the controller 124 determines that a backflow condition exists and controls the shut-off valve 120 to prevent further dispensing of carbonated water until the carbonation system 100 has been serviced.

If not, then at 410, the controller 124 detects bubbles at the water inlet to the carbonator 111. For example, the controller 124 receives a measurement from the thermal mass flow meter 106 about an order of magnitude off from an expected value as discussed above. Upon detecting a bubble, at 412, the controller 124 determines whether the detected bubble(s) exceed a threshold amount of gas for detecting a backflow condition. For example, the threshold amount may be a threshold number of bubble, a threshold number of bubbles within a predetermined period of time, or a total volume of gas detected. If so, then at 414, the controller 124 determines that a backflow condition exists and controls the shut-off valve 120 to prevent further dispensing of carbonated water until the carbonation system 100 has been serviced. If not, the process loops back to 402.

Variations in the method 400 are contemplated by this disclosure. For example, one or more of the sets of measurement and determination may be omitted (e.g., measuring a fluid temperature and determining whether it is below a threshold temperature at 406 and 408). Additionally or alternatively, one or more of the sets of measurement and determination may be performed in parallel as opposed to serially implemented as shown. Upon any of the conditions being satisfied, the backflow condition may be detected.

While the examples of FIGS. 3 and 4 are provided above with respect to the backflow preventer 102, similar implementations may be used for the second backflow preventer 116 when present. In this case, as opposed to detecting gas above a threshold in 412, the thermal mass flow meter in the second backflow preventer 116 is configured to detect an amount of liquid above a threshold amount.

Figure 5:
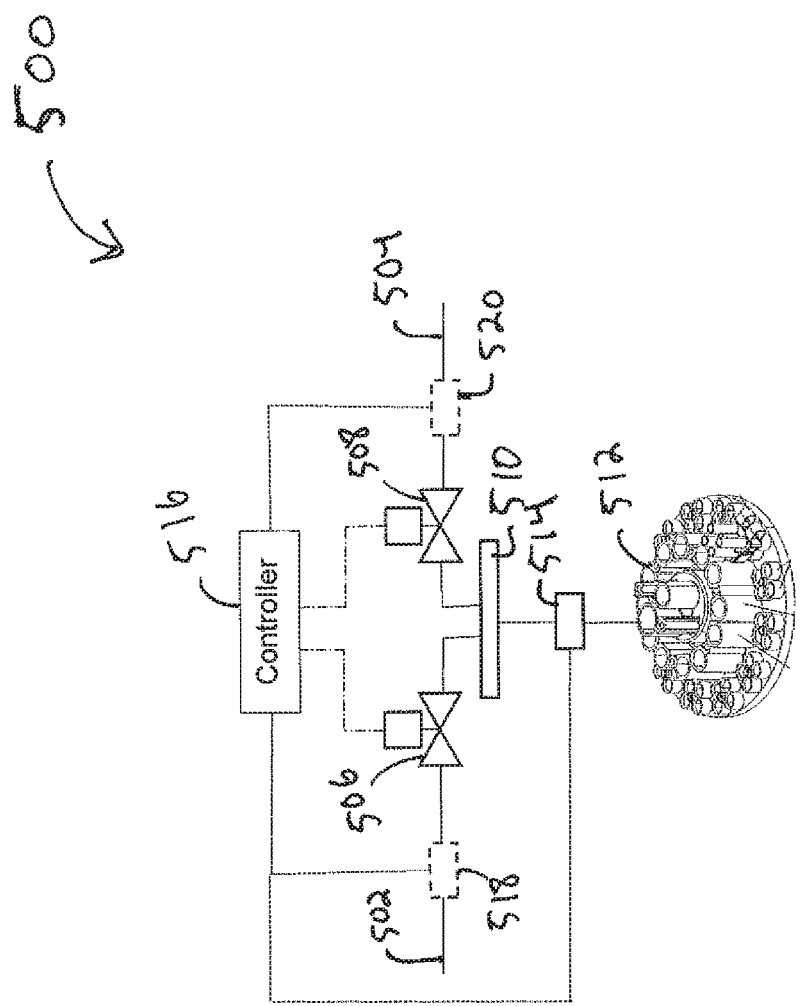
FIG. 5 is a block diagram of a mixing valve system according to the teachings herein.

FIG. 5 is a block diagram of a mixing valve system 500 according to the teachings herein. The mixing valve system 500 includes a first inlet 502 and a second inlet 504. Each of the inlets 502, 504 is adapted to receive a fluid flow. For example, for dispensing a fluid with a target temperature, the first inlet 502 is adapted to receive cold water from a cold water supply, such as a municipal water source, and the second inlet 504 is adapted to receive hot water from a hot water supply, such as a boiler (not shown). Other fluid supplies may be used in other examples. For example, for dispensing a fluid with a target carbonation level, the first inlet 502 is adapted to receive uncarbonated water and the second inlet 504 is adapted to receive carbonated water. Other variations in the fluid supplies are contemplated by this disclosure.

The first inlet 502 is fluidically coupled to an inlet of a proportional control valve 506. Likewise, the second inlet 504 is fluidically coupled to an inlet of a proportional control valve 508. An outlet of the proportional control valve 506 and an outlet of the proportional control valve 508 are both fluidically coupled to an inlet of a manifold 510. The proportional control valves 506, 508 are dynamically controlled to adjust an amount or flow rate of fluid provided from an outlet of the proportional control valves 506, 508. For example, the proportional control valves 506, 508, may be implemented as a variable orifice needle valve or solenoid valve. Other types of proportional control valves are contemplated by this disclosure. Each of the proportional control valves 506, 508 is independently controlled for providing varying flow rates of fluid from the inlets 502, 504 to the manifold 510. In some implementations, a shut-off valve (not shown) may additionally be provided upstream or downstream of each of the proportional control valves 506, 508.

In some implementations, the manifold 510 may include a static or dynamic mixer for promoting the mixing of the fluid streams output from the proportional control valves 506, 508. An outlet of the manifold 510 is fluidically coupled to an inlet of a nozzle 512. The nozzle 512 is adapted to receive and dispense the mixed fluid stream received from the manifold 510. In some implementations, the nozzle 512 is further adapted to mix the mixed fluid stream received with the manifold 510 with one or more additional fluid streams. For example, in a beverage dispenser, the nozzle 512 may be adapted to mix one or more beverage ingredient sources with the mixed fluid stream received from the manifold 510.

A thermal mass flow meter 514 is positioned in a flow path between the manifold 510 and the nozzle 512. In some implementations, a shut-off valve (not shown) may also be provides along the flow path between the manifold 510 and the nozzle 512. As described above, the thermal mass flow meter 514 is configured to measure a temperature and flow rate of the mixed fluid stream as well as detect bubbles in the mixed fluid stream. The thermal mass flow meter 514 is electrically coupled to a controller 516 for communicating measurements of the flow rate, temperature, and/or detection of a bubble. As discussed above, the measurements may take the form of a voltage or current signal indicative of a measured value or as a communication of a determined value of a measured parameter (e.g., temperature value or flow rate value). In turn the controller 516 is electrically coupled to the proportional control valves 506, 508 to control operation thereof to provide a desired amount or ratio of mixing between fluids received at the inlets 502, 504.

In use, the thermal mass flow meter 514 provides a feedback loop to the controller 516 by measuring properties of the mixed fluid stream which are used by the controller 516 to adjust the operation of the proportional control valves 506, 508 to provide a desired mixed fluid stream. For example, for dispensing a fluid with a target temperature, the controller 516 may receive a measurement from the thermal mass flow meter 514 of a temperature of the mixed fluid stream and adjust the proportional control valves 506, 508 to adjust the ratio of hot and cold water from the inlets 502, 504 to provide a desired output temperature. Dispensing systems incorporating such target temperature dispensing may include a hot beverages dispenser for dispensing coffees and teas at different temperatures suited to the beverage being dispensed, for example.

In another example, for dispensing a fluid with a target carbonation level, the controller 516 may receive a measurement from the thermal mass flow meter 514 of a number of bubbles and/or a flow rate in the mixed fluid stream and adjust the proportional control valves 506, 508 to adjust the ratio of carbonated and uncarbonated water from the inlets 502, 504 to provide a desired carbonation level.

In some implementations, a first thermal mass flow meter 518 is provided in the flow path between the first inlet 502 and the proportional control valve 506. Likewise, a second thermal mass flow meter 520 is provided in the flow path between the second inlet 504 and the proportional control valve 508. The first and second thermal mass flow meters 518, 520 may be used in addition to or as an alternative to the thermal mass flow meter 514. The controller 516 may adjust operation of the proportional control valve 506 based on measurements received from the first thermal mass flow meter 518 and may adjust operation of the proportional control valve 508 based on measurements received from the second thermal mass flow meter 520. Other variations are contemplated by this disclosure.

Figure 6:
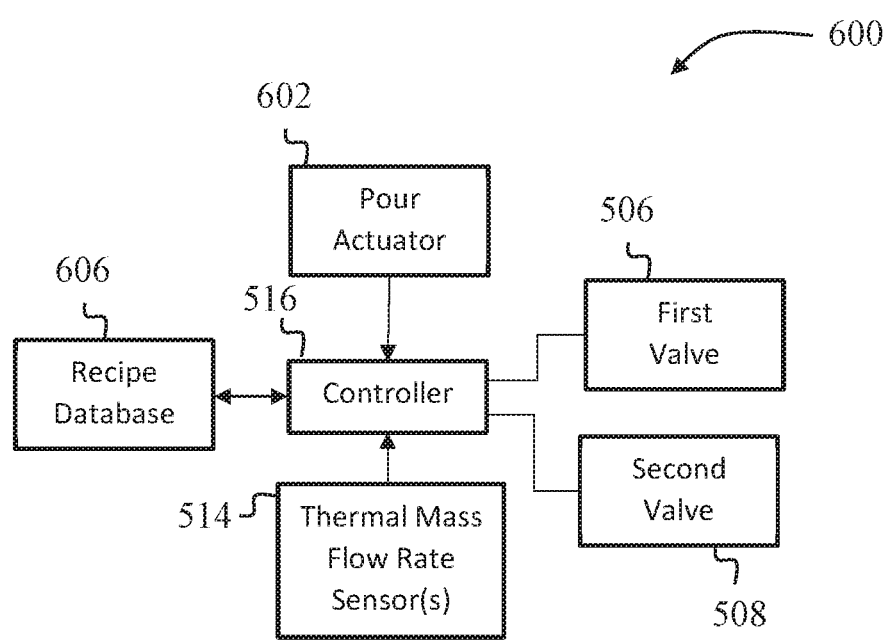
FIG. 6 is a block diagram of a control system including a controller for controlling the mixing valve dispensing system according to FIG. 5.

FIG. 6 is a block diagram of a control system including the controller 516 for controlling the mixing valve system 500 according to FIG. 5. A pour actuator 602 provides an "on" signal to the controller 516 upon being actuated. For example, in a beverage dispenser, the pour actuator 602 may be a dispense button or lever actuated by an end-user of the beverage dispenser to initiate dispensing a carbonated beverage. The pour actuator 602 may be provided by any physical, virtual (e.g., icon in a touchscreen, etc.), or logical (e.g., automatically provided upon satisfying an operating condition) actuation to initiate a flow of the fluid. The controller 516 also receives or retrieves a set point for the mixed fluid stream from a recipe database 606. Upon receiving the "on" signal, the controller 516 is configured to send a control signal to each the first and second valves 506, 508 to supply an amount of fluid from the inlets 502, 504 according to the set point. For example, the set point may indicate a desired temperature or carbonation level for the mixed fluid stream. The controller 516 may also send a control signal to one or more shut-off valves (not shown) for dispensing the mixed fluid stream from the manifold 510 to the nozzle 512.

The controller 516 also receives a flow rate signal, temperature signal, and/or a bubble detection signal from the thermal mass flow meter 514. Based on the feedback provided by the thermal mass flow meter 514, the controller 516 adjusts one or both of the proportional control valves 506, 508. In some implementations, the controller 516 adjusts the proportional control valves 506, 508 so as to maintain a constant flow rate for the mixed fluid stream dispensed from the manifold 510. For example, for dispensing water with a target temperature, the thermal mass flow meter 514 may provide a measurement indicative that the temperature of the mixed fluid stream is below the set point temperature.

Accordingly, the controller 514 may adjust the proportional control valve 508 to increase the flow rate of hot water provided from the second inlet 504 and at the same time adjust the proportional control valve 506 to proportionally reduce the flow rate of cold water provided from the first inlet 502. By adjusting both valves, the temperature of the mixed fluid stream is adjusted to be closer to the set point while at the same time maintaining a substantially constant flow rate for the mixed fluid stream.

Various alternatives to the control system 600 may be made without departing from the spirit or scope of this disclosure. For example, the control system 600 may additionally or alternatively receive feedback signals from the thermal mass flow rate meters 518, 520 when present.

Figure 7:
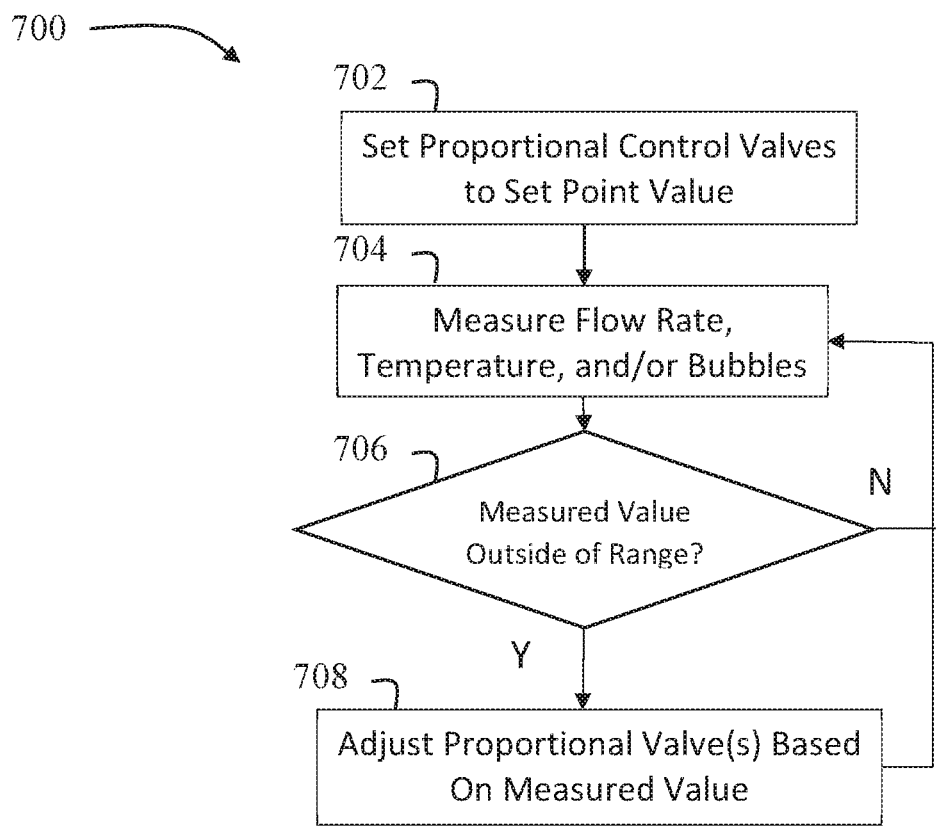
FIG. 7 is a flow diagram of a method of controlling the mixing valve dispensing system.

FIG. 7 is a flow diagram of a method 700 of controlling the mixing valve system 500. At 702, the controller 516 sets the proportional control valves 506, 508 based on a set point value for a parameter of the mixed fluid stream output from the manifold 510. For example, the set point value may be a desired water temperature. At 704, the controller 516 receives a measurement of a flow parameter from the thermal mass flow rate meter 514, such as a flow rate signal, temperature signal, and/or a bubble detection signal. For example, the controller 516 receives a temperature signal from the thermal mass flow rate meter 514 indicative of the temperature of the water output from the manifold 510. At 706, the controller 516 determines whether the received parameter measurement is outside of a predetermined range of the set point value. For example, the controller 516 may determine if the temperature of the water measured by the thermal mass flow rate meter 514 is outside of 1° C. of the set point temperature. If not, the process repeats at 704 with an additional measurement of the flow parameter. Otherwise, at 708, the controller 516 adjusts one or more of the proportional control valves 506, 508 based on the measured parameter value and the set point value. For example, upon determining that the temperature of the water measured by the thermal mass flow rate meter 514 is less than 1° C. of the set point temperature (e.g., 2° C. lower than the set point temperature), the controller 516 adjusts the proportional control valve 506 to reduce the amount or flow rate of cold water provided to the manifold 510 and adjusts the proportional control valve 508 to increase the amount or flow rate of hot water provided to the manifold 510.

In various embodiments, the backflow preventer module 102 or the mixing valve system 500 may be used within a beverage dispensing system to regulate the flow of one or more beverage ingredients. For example, a beverage dispensing system (which may include one or more macro-ingredients and one or more micro-ingredients) combines macro-ingredients (such as sweeteners, water, or carbonated water) and micro-ingredients (such as high intensity sweeteners, flavorings, food acids, or additives) to create a finished beverage. Such micro-dosing functionality may increase the dispensing capabilities of the beverage dispensing system to deliver a large variety of beverages and improve the quality of the beverage dispensed by the beverage dispensing system.

Generally described, the macro-ingredients may have reconstitution ratios in the range from full strength (no dilution) to about six (6) to one (1) (but generally less than about ten (10) to one (1)). As used herein, the reconstitution ratio refers to the ratio of diluent (e.g., water or carbonated water) to beverage ingredient. Therefore, a macro-ingredient with a 5:1 reconstitution ratio refers to a macro-ingredient that is to be dispensed and mixed with five parts diluent for every part of the macro-ingredient in the finished beverage. Many macro-ingredients may have reconstitution ratios in the range of about 3:1 to 5.5:1, including 4.5:1, 4.75:1, 5:1, 5.25:1, 5.5:1, and 8:1 reconstitution ratios.

The macro-ingredients may include sweeteners such as sugar syrup, HFCS ("High Fructose Corn Syrup"), FIS ("Fully Inverted Sugar"), MIS ("Medium Inverted Sugar"), mid-calorie sweeteners comprised of nutritive and non-nutritive or high intensity sweetener blends, and other such nutritive sweeteners that are difficult to pump and accurately meter at concentrations greater than about 10:1—particularly after having been cooled to standard beverage dispensing temperatures of around 35-45° F. An erythritol sweetener may also be considered a macro-ingredient sweetener when used as the primary sweetener source for a beverage, though typically erythritol will be blended with other sweetener sources and used in solutions with higher reconstitution ratios such that it may be considered a micro-ingredient as described below.

The macro-ingredients may also include traditional BIB ("bag-in-box") flavored syrups (e.g., COCA-COLA bag-in-box syrup) which contain all of a finished beverage's sweetener, flavors, and acids that when dispensed is to be mixed with a diluent source such as plain or carbonated water in ratios of around 3:1 to 6:1 of diluent to the syrup. Other typical macro-ingredients may include concentrated extracts, purees, juice concentrates, dairy products or concentrates, soy concentrates, and rice concentrates.

The macro-ingredient may also include macro-ingredient base products. Such macro-ingredient base products may include the sweetener as well as some common flavorings, acids, and other common components of a plurality of different finished beverages. However, one or more additional beverage ingredients (either micro-ingredients or macro-ingredients as described herein) other than the diluent are to be dispensed and mix with the macro-ingredient base product to produce a particular finished beverage. In other words, the macro-ingredient base product may be dispensed and mixed with a first micro-ingredient non-sweetener flavor component to produce a first finished beverage. The same macro-ingredient base product may be dispensed and mixed with a second micro-ingredient non-sweetener flavor component to produce a second finished beverage.

The macro-ingredients described above may be stored in a conventional bag-in-box container in, at and/or remote from the dispenser. The viscosity of the macro-ingredients may range from about 1 to about 10,000 centipoise and generally over 100 centipoises or so when chilled. Other types of macro-ingredients may be used herein.

The micro-ingredients may have reconstitution ratios ranging from about ten (10) to one (1) and higher. Specifically, many micro-ingredients may have reconstitution ratios in the range of about 20:1, to 50:1, to 100:1, to 300:1, or higher. The viscosities of the micro-ingredients typically range from about one (1) to about six (6) centipoise or so, but may vary from this range. In some instances, the viscosities of the micro-ingredients may be forty (40) centipoise or less. Examples of micro-ingredients include natural or artificial flavors; flavor additives; natural or artificial colors; artificial sweeteners (high potency, nonnutritive, or otherwise); antifoam agents, nonnutritive ingredients, additives for controlling tartness, e.g., citric acid or potassium citrate; functional additives such as vitamins, minerals, herbal extracts, nutraceuticals; and over the counter (or otherwise) medicines such as pseudoephedrine, acetaminophen; and similar types of ingredients. Various acids may be used in micro-ingredients including food acid concentrates such as phosphoric acid, citric acid, malic acid, or any other such common food acids. Various types of alcohols may be used as either macro- or micro-ingredients. The micro-ingredients may be in liquid, gaseous, or powder form (and/or combinations thereof including soluble and suspended ingredients in a variety of media, including water, organic solvents, and oils). Other types of micro-ingredients may be used herein.

Typically, micro-ingredients for a finished beverage product include separately stored non-sweetener beverage component concentrates that constitute the flavor components of the finished beverage. Non-sweetener beverage component concentrates do not act as a primary sweetener source for the finished beverage and do not contain added sweeteners, though some non-sweetener beverage component concentrates may have sweet tasting flavor components or flavor components that are perceived as sweet in them. These non-sweetener beverage component concentrates may include the food acid concentrate and food acid-degradable (or non-acid) concentrate components of the flavor, such as described in commonly owned U.S. patent application Ser. No. 11/276,553, entitled "Methods and Apparatus for Making Compositions Comprising and Acid and Acid Degradable Component and/or Compositions Comprising a Plurality of Selectable Components," which is herein incorporated by reference in its entirety. As noted above, micro-ingredients may have reconstitution ratios ranging from about ten (10) to one (1) and higher, where the micro-ingredients for the separately stored non-sweetener beverage component concentrates that constitute the flavor components of the finished beverage typically have reconstitution ratios ranging from 50:1, 75:1, 100:1, 150:1, 300:1, or higher.

For example, the non-sweetener flavor components of a cola finished beverage may be provided from separately stored first non-sweetener beverage component concentrate and a second non-sweetener beverage component concentrate. The first non-sweetener beverage component concentrate may comprise the food acid concentrate components of the cola finished beverage, such as phosphoric acid. The second non-sweetener beverage component concentrate may comprise the food acid-degradable concentrate components of the cola finished beverage, such as flavor oils that would react with and impact the taste and shelf life of a non-sweetener beverage component concentrate were they to be stored with the phosphoric acid or other food acid concentrate components separately stored in the first non-sweetener component concentrate. While the second non-sweetener beverage component concentrate does not include the food acid concentrate components of the first non-sweetener beverage component concentrate (e.g., phosphoric acid), the second non-sweetener beverage component concentrate may still be a high-acid beverage component solution (e.g., pH less than 4.6).

A finished beverage may have a plurality of non-sweetener concentrate components of the flavor other than the acid concentrate component of the finished beverage. For example, the non-sweetener flavor components of a cherry cola finished beverage may be provided from the separately stored non-sweetener beverage component concentrates described in the above example as well as a cherry non-sweetener component concentrate. The cherry non-sweetener component concentrate may be dispensed in an amount consistent with a recipe for the cherry cola finished beverage. Such a recipe may have more, less, or the same amount of the cherry non-sweetener component concentrate than other recipes for other finished beverages that include the cherry non-sweetener component concentrate. For example, the amount of cherry specified in the recipe for a cherry cola finished beverage may be more than the amount of cherry specified in the recipe for a cherry lemon-lime finished beverage to provide an optimal taste profile for each of the finished beverage versions. Such recipe-based flavor versions of finished beverages are to be contrasted with the addition of flavor additives or flavor shots as described below.

Other typical micro-ingredients for a finished beverage product may include micro-ingredient sweeteners. Micro-ingredient sweeteners may include high intensity sweeteners such as aspartame, Ace-K, steviol glycosides (e.g., Reb A, Reb M), sucralose, saccharin, or combinations thereof. Micro-ingredient sweeteners may also include erythritol when dispensed in combination with one or more other sweetener sources or when using blends of erythritol and one or more high intensity sweeteners as a single sweetener source.

Other typical micro-ingredients for supplementing a finished beverage product may include micro-ingredient flavor additives. Micro-ingredient flavor additives may include additional flavor options that can be added to a base beverage flavor. The micro-ingredient flavor additives may be non-sweetener beverage component concentrates. For example, a base beverage may be a cola flavored beverage, whereas cherry, lime, lemon, orange, and the like may be added to the cola beverage as flavor additives, sometimes referred to as flavor shots. In contrast to recipe-based flavor versions of finished beverages, the amount of micro-ingredient flavor additive added to supplement a finished beverage may be consistent among different finished beverages. For example, the amount of cherry non-sweetener component concentrate included as a flavor additive or flavor shot in a cola finished beverage may be the same as the amount of cherry non-sweetener component concentrate included as a flavor additive or flavor shot in a lemon-lime finished beverage. Additionally, whereas a recipe-based flavor version of a finished beverage is selectable via a single finished beverage selection icon or button (e.g., cherry cola icon/button), a flavor additive or flavor shot is a supplemental selection in addition to the finished beverage selection icon or button (e.g., cola icon/button selection followed by a cherry icon/button selection).

As is generally understood, such beverage selections may be made through a touchscreen user interface or other typical beverage user interface selection mechanism (e.g., buttons) on a beverage dispenser. The selected beverage, including any selected flavor additives, may then be dispensed upon the beverage dispenser receiving a further dispense command through a separate dispense button on the touchscreen user interface or through interaction with a separate pour mechanism such as a pour button (electromechanical, capacitive touch, or otherwise) or pour lever.

In the traditional BIB flavored syrup delivery of a finished beverage, a macro-ingredient flavored syrup that contains all of a finished beverage's sweetener, flavors, and acids is mixed with a diluent source such as plain or carbonated water in ratios of around 3:1 to 6:1 of diluent to the syrup. In contrast, for a micro-ingredient delivery of a finished beverage, the sweetener(s) and the non-sweetener beverage component concentrates of the finished beverage are all separately stored and mixed together about a nozzle when the finished beverage is dispensed. Example nozzles suitable for dispensing of such micro-ingredients include those described in commonly owned U.S. provisional patent application Ser. No. 62/433,886, entitled "Dispensing Nozzle Assembly," PCT patent application Ser. No. 15/026,657, entitled "Common Dispensing Nozzle Assembly," U.S. Pat.

No. 7,866,509, entitled "Dispensing Nozzle Assembly," or U.S. Pat. No. 7,578,415, entitled "Dispensing Nozzle Assembly," which are all herein incorporated by reference in their entirety.

In operation, the beverage dispenser may dispense finished beverages from any one or more of the macro-ingredient or micro-ingredient sources described above. For example, similar to the traditional BIB flavored syrup delivery of a finished beverage, a macro-ingredient flavored syrup may be dispensed with a diluent source such as plain or carbonated water to produce a finished beverage. Additionally, the traditional BIB flavored syrup may be dispensed with the diluent and one or more micro-ingredient flavor additives to increase the variety of beverages offered by the beverage dispenser.

Micro-ingredient-based finished beverages may be dispensed by separately dispensing each of the two or more non-sweetener beverage component concentrates of the finished beverage along with a sweetener and diluent. The sweetener may be a macro-ingredient sweetener and/or a micro-ingredient sweetener and the diluent may be water and/or carbonated water. For example, a micro-ingredient-based cola finished beverage may be dispensed by separately dispensing food acid concentrate components of the cola finished beverage, such as phosphoric acid, food acid-degradable concentrate components of the cola finished beverage, such as flavor oils, macro-ingredient sweetener, such as HFCS, and carbonated water. In another example, a micro-ingredient-based diet-cola finished beverage may be dispensed by separately dispensing food acid concentrate components of the diet-cola finished beverage, food acid-degradable concentrate components of the diet-cola finished beverage, micro-ingredient sweetener, such as aspartame or an aspartame blend, and carbonated water. As a further example, a mid-calorie micro-ingredient-based cola finished beverage may be dispensed by separately dispensing food acid concentrate components of the mid-calorie cola finished beverage, food acid-degradable concentrate components of the mid-calorie cola finished beverage, a reduced amount of a macro-ingredient sweetener, a reduced amount of a micro-ingredient sweetener, and carbonated water. By reduced amount of macro-ingredient and micro-ingredient sweeteners, it is meant to be in comparison with the amount of macro-ingredient or micro-ingredient sweetener used in the cola finished beverage and diet-cola finished beverage. As a final example, a supplemental flavored micro-ingredient-based beverage, such as a cherry cola beverage or a cola beverage with an orange flavor shot, may be dispensed by separately dispensing a food acid concentrate components of the flavored cola finished beverage, food acid-degradable concentrate components of the flavored cola finished beverage, one or more non-sweetener micro-ingredient flavor additives (dispensed as either as a recipe-based flavor version of a finished beverage or a flavor shot), a sweetener (macro-ingredient sweetener, micro-ingredient sweetener, or combinations thereof), and carbonated water. While the above examples are provided for carbonated beverages, they apply to still beverages as well by substituting carbonated water with plain water.

The various ingredients may be dispensed by the beverage dispenser in a continuous pour mode where the appropriate ingredients in the appropriate proportions (e.g., in a predetermined ratio) for a given flow rate of the beverage being dispensed. In other words, as opposed to a conventional batch operation where a predetermined amount of ingredients are combined, the beverage dispenser provides for continuous mixing and flows in the correct ratio of ingredients for a pour of any volume. This continuous mix and flow method can also be applied to the dispensing of a particular size beverage selected by the selection of a beverage size button by setting a predetermined dispensing time for each size of beverage.

Figure 8:
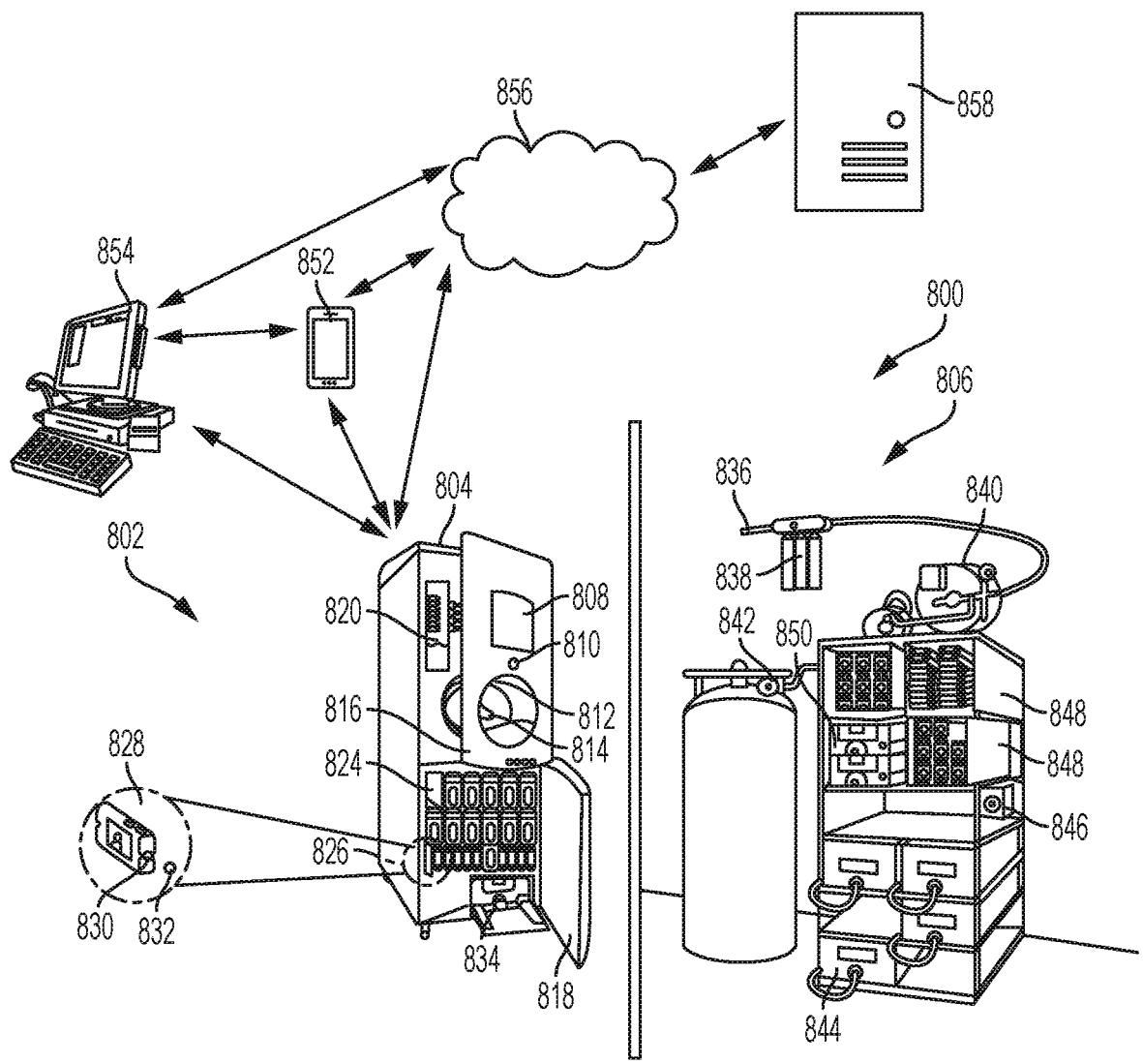
FIG. 8 is an exemplary beverage dispenser system according to the teachings herein.

FIG. 8 illustrates an exemplary beverage dispenser system 800 suitable for implementing the several embodiments of the disclosure. As shown, the beverage dispenser system 800 is configured as an ice cooled beverage dispenser. Other configurations of beverage dispensers are contemplated by this disclosure such as a drop-in ice-cooled beverage dispenser, a counter electric beverage dispenser, a remote recirculation beverage dispenser, or any other beverage dispenser configuration.

The beverage dispenser system 800 includes a front room system 802 with a beverage dispenser 804 and a back room system 806. The beverage dispenser 804 includes a user interface 808, such as a touchscreen display, to facilitate selection of the beverage to be dispensed. The user interface 808 may employ various screens to facilitate user interactions on the beverage dispenser 804 and/or receive a user profile through interaction with a user's mobile device 852, such as described in commonly owned U.S. patent application Ser. No. 14/485,826, entitled "Product Categorization User Interface for a Dispensing Device," which is herein incorporated by reference in its entirety.

Upon receiving a beverage selection via the user interface 808, a pour button 810 may be activated to dispense the selected beverage from the beverage dispenser 804 via a nozzle 814. For example, the pour button 810 may be an electromechanical button, capacitive touch button, or other button selectable by a user to activate the beverage dispenser 804 to dispense a beverage. While shown as a button, the pour button 810 may alternatively be implemented as a lever or other mechanism for activating the beverage dispenser 804 to dispense a beverage. As shown in FIG. 8, the pour button 810 is separate from the user interface 808. In some implementations, the pour button 810 may be implemented as a selectable icon in the user interface 808.

In some implementations, the beverage dispenser may also include an ice lever 814. Upon being activated, the ice lever 814 may cause the beverage dispenser 804 to dispense ice through an ice chute (not shown). For beverage dispensers that do not have an ice bin, such as counter-electric or remote recirculation beverage dispensers, the ice lever 814 may be omitted.

The beverage dispenser 804 may be secured via a primary door 816 and an ingredient door 818. The primary door 816 and the ingredient door 818 may be secured via one or more locks. In some implementations, the locks are a lock and key. In some implementations, the lock on the ingredient door 818 may be opened via an RFID reader (not shown) reading an authorize ingredient package 828. The primary door 816 may secure electronic components of the beverage dispenser 804 including one or more controllers 820. The ingredient door 818 may secure an ingredient compartment that houses an ingredient matrix 824.

The ingredient matrix 824 includes a plurality of slots 826 for receiving ingredient packages 828. In various implementations, the ingredient packages 828 may be micro-ingredient cartridges. The micro-ingredient cartridges may be single cartridges or double cartridges, such as described in commonly owned U.S. patent application Ser. No. 14/209,684, entitled "Beverage Dispenser Container and Carton," and U.S. patent application Ser. No. 12/494,427, entitled "Container Filling Systems and Methods," which are both herein incorporated by reference in their entirety. As shown in FIG. 8, there are three drawers of ingredients in the ingredient matrix 824. One or more of the drawers may slide back and forth along a rail so as to periodically agitate the ingredients housed on the drawer. Other configurations of the ingredient matrix 824 are possible, such as via one or more static and/or agitated ingredient towers.

Each ingredient package 828 may comprise an RFID tag, a fitment 830, and a fitment seal 832. The fitment seal 832 may be removed prior to installation into the beverage dispenser 804. Upon installation, the fitment 830 may engage with and provide a fluidic communication between a probe (not shown) in the slot 826 and the ingredients contained in the ingredient package 828. The ingredient matrix 824 may also contain one or more large volume micro-ingredient packages 834, such as for one or more micro-ingredient sweetener sources.

The beverage dispenser 804 may also include a carbonator (not shown) for receiving water and carbon dioxide to produce carbonated water. The beverage dispenser 804 may also include one or more heat exchangers (not shown), such as a cold plate, for cooling one or more of the beverage ingredients contained in or received by the beverage dispenser 804. In some implementations, one or more of the micro-ingredients dispensed via the nozzle 812 are not cooled via the heat exchanger or are otherwise maintained at an ambient temperature. Macro-ingredients dispensed via the nozzle 812 are typically cooled via the heat exchanger prior to being dispensed.

The back room system 806 is typically located in a back room remote from the front room system 802, such as a storage area in a merchant location. The back room system 806 includes a water source 836 such as a municipal water supply that provides a pressurized source of plain water. The water received via the water source 836 may be filtered or otherwise treated by a water treatment system 838. The treated water may optionally be pressurized to a desired pressure with a water booster 840 and supplied to the beverage dispenser. A carbon dioxide source 842 may supply carbon dioxide to the beverage dispenser 804.

One or more macro-ingredient sources 844 may be located in the back room. The macro-ingredient from each macro-ingredient source 844 may be supplied to the beverage dispenser 804 via a pump 846. The pump 846 may be a controlled gear pump, diaphragm pump, BIB pump, or any other suitable pump for supplying macro-ingredients to the beverage dispenser 804. The back room system 806 may also include a rack with one or more storage locations 848 for spare micro-ingredients and one or more storage locations 850 for spare macro-ingredients.

The beverage dispenser 804 may include one or more network interfaces for communicating directly with devices in the front room or the back room, communicating with devices in the front room or the back room in a local area network (LAN), or communicating with devices remote from a location with the beverage dispenser system 800 via a wide area network (WAN) connection. For example, the beverage dispenser 804 may include networking devices such as a near field communication (NFC) module, a BLUETOOTH module, a Wi-Fi module, a cellular modem, an Ethernet module, and the like. The beverage dispenser 804 may communicate via a direct communication or via a LAN with a user's mobile device 852 or a point-of-sale (POS) device 854 to receive a beverage selection or user profile of a user for configuring the beverage dispenser 804 to dispense one or more beverages based on the beverage selection or user profile. The user profile may include stored favorite beverages for the user, mixed or blended beverages created or stored by the user in their profile, and/or one or more beverage preferences, such as preferred nutritive level. The beverage dispenser 804 may also communicate via a WAN 856 for communicating with one or more remote servers 858 to receive software updates, content updates, user profiles, or beverage selections made via the remote server 858.

Figure 9:
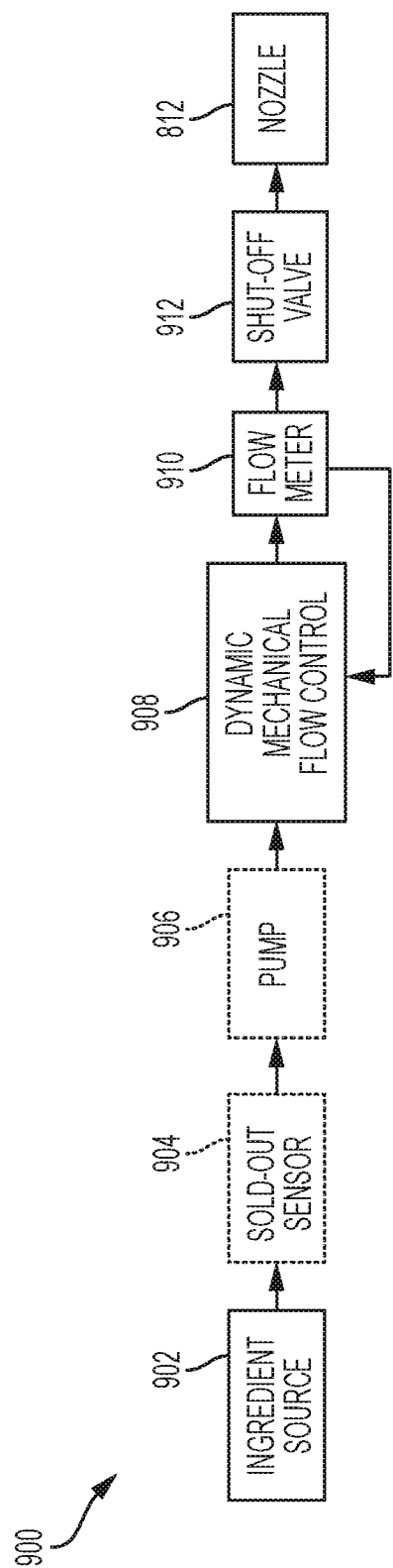
FIG. 9 is an exemplary fluidic circuit with the flow control module according to the teachings herein.

FIG. 9 illustrates an exemplary fluidic circuit 900 with pumping or metering devices from ingredient source 902 to the nozzle 812 of the beverage dispenser 904. For each ingredient source, the beverage dispenser 904 may include the fluidic circuit shown in FIG. 9. For example, the fluidic circuit for one or more of the macro-ingredient sources may include the fluidic circuit shown in FIG. 9. In some implementations, the fluidic circuit for the carbonated water and/or the still water source may include the fluidic circuit shown in FIG. 9.

FIG. 9 illustrates an exemplary fluidic circuit 900 with a dynamic mechanical flow control 908, a flow meter 910, and a shut-off valve 912 suitable for implementing the several embodiments of the disclosure. The dynamic mechanical flow control 908 receives a pressurized beverage ingredient from an ingredient source 902 and provides an adjustable flow rate of the beverage ingredient to the nozzle 812. The dynamic mechanical flow control 908 may include a variable sized orifice that adjusts to dynamically change the flow rate of the beverage ingredient supplied to the nozzle 812 based on control signals provided by the one or more controllers 820. A flow meter 910 downstream of the dynamic mechanical flow control 908 measures a flow rate of the beverage ingredient being supplied by the dynamic mechanical flow control 908 and provides a feedback loop to the dynamic mechanical flow control 908 for controlling the variable sized orifice. A shut-off valve 912 downstream of the dynamic mechanical flow control 908 may be actuated to open and close in order to dispense or prevent dispensing the beverage ingredient from the nozzle 812. In various implementations, the dynamic flow control module 908, the flow meter 910, and the shut-off valve 912 may be substituted for the flow control module 100 as described herein. As discussed above, the flow control module 100 has a different order of components that shown for the dynamic flow control module 908, the flow meter 910, and the shut-off valve 912 in FIG. 9.

The ingredient source 902 may be a micro-ingredient source or a macro-ingredient source housed in the ingredient matrix 824 of the beverage dispenser 904, remote from the beverage dispenser 904 in the front room (e.g., adjacent to the beverage dispenser 904 or under a counter on which the beverage dispenser 904 is located), or located in the back room. The ingredient source 902 may also be the municipal water supply 836 or other pressurized ingredient source. When the ingredient source 902 is not pressurized, the fluidic circuit 900 may include a pump 906 for pressurizing the beverage ingredient from the ingredient source 902. The pump 906 may be any pump suitable for pressurizing the beverage ingredient from the ingredient source 902, such as a BIB pump, CO2 driven pump, controlled gear pump, or positive displacement pump. The fluidic circuit 900 may also optionally include a sold-out sensor 904 for detecting when the ingredient source 902 is empty.

While the components of the fluidic circuit 900 are shown in a particular order in, any order of the components described above may be used. Other variations are readily recognizable by those of ordinary skill in the art. Additionally, one or more heat exchangers (not shown) may be used at any location in the fluidic circuit 900. The heat exchanger may include an ice bin, water bath, cold plate, or remote recirculation system.

Figure 10:
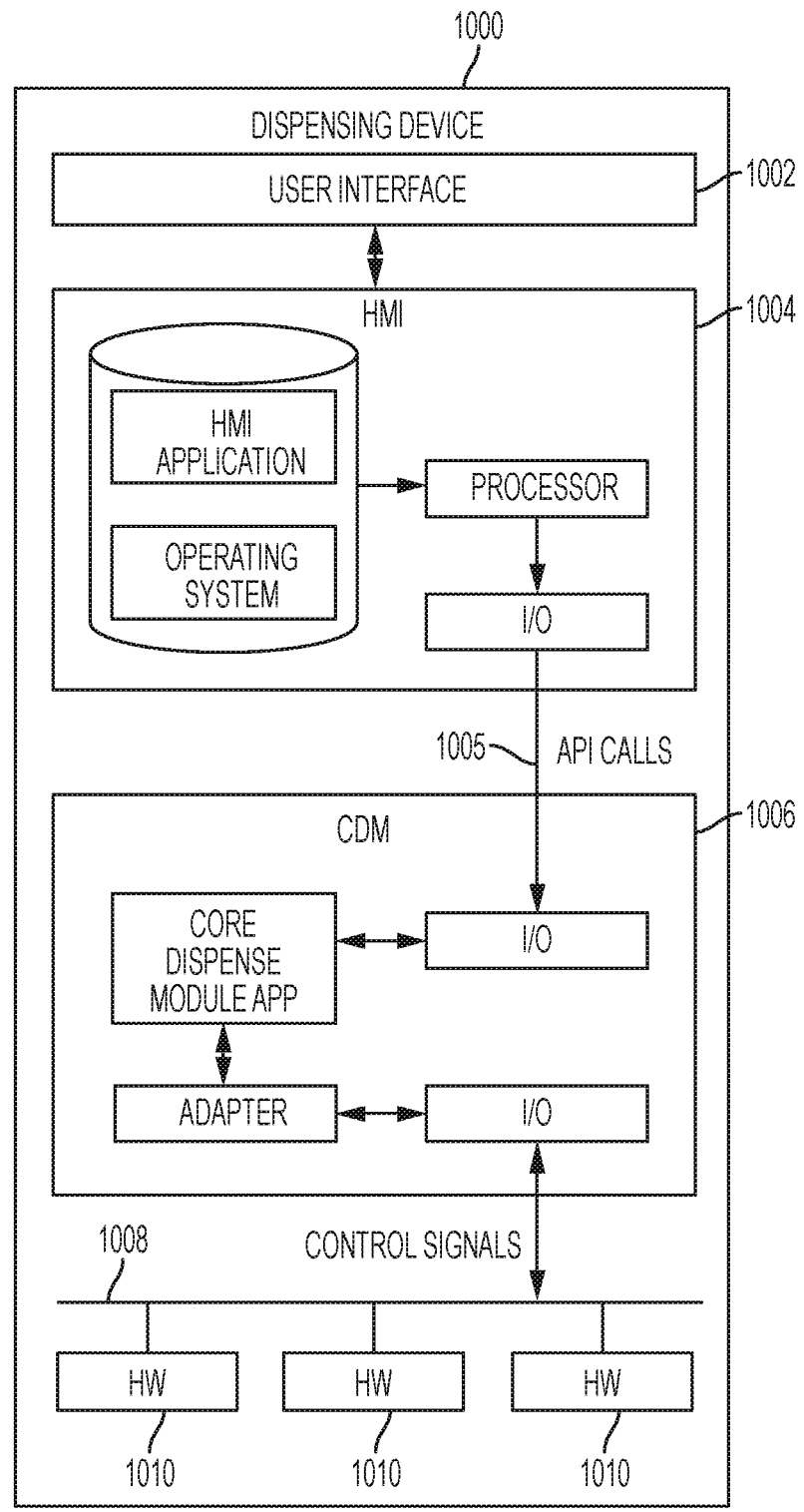
FIG. 10 is an exemplary block diagram of a control architecture for a beverage dispenser according to the teachings herein.

FIG. 10 illustrates an exemplary block diagram of a control architecture 1000 that may be used to control the beverage dispenser 804 suitable for implementing the several embodiments of the disclosure. As shown in FIG. 10, control architecture 1000 may comprise a core dispense module (CDM) 1006, a human machine interface (HMI) module 1004, a user interface (UI) 1002, and a machine bus (MBUS) 1005. HMI 1004 may connect to or otherwise interface and communicate with at least one external device (e.g., mobile device 852 or POS 854) being external to beverage dispenser 804. HMI 1004 may also control and update display screens on UI 1002. CDM 1006 may control flows from a plurality of pumps and/or valves 1010 in beverage dispenser 804 according to a recipe to mix and dispense a product (e.g., a beverage) from beverage dispenser 804. For example, the CDM 1006 may control the flow of a beverage ingredient through the flow control module 100. In various implementations, the controller 124 may be embodied in the CDM 1006 or one or more of the pumping or metering devices 1010.

Beverage ingredients (e.g., micro-ingredients, macro-ingredients, and/or diluents) may be combined to dispense various products that may include beverages or blended beverages (i.e., finished beverage products) from beverage dispenser 804. However, beverage dispenser 804 may also be configured to dispense beverage components individually.

An example of control architecture 1000 for beverage dispenser 804 may be described in U.S. Ser. No. 61/987,020, entitled "Dispenser Control Architecture", filed on May 1, 2014, the entirety of which is hereby incorporated by reference. MBUS 1005 may facilitate communication between HMI 1004 and CDM 1006 via one or more API calls. HMI 1004, MBUS 1005, and CDM 1006 may collectively comprise common core components, implemented as hardware or as combination of hardware and software, which may be adapted to provide customized functionality in beverage dispenser 804. Beverage dispenser 804 may further include memory storage and a processor. Examples of UI 1002 may be described in U.S. Ser. No. 61/877,549, entitled "Product Categorization User Interface for a Dispensing Device", filed on Sep. 13, 2013, the entirety of which is hereby incorporated by reference.

UI 1002 may detect what area of a touch screen has been touched by a user (e.g., user 108). In response, UI 1002 may send HMI 1004 data regarding where the touch screen was touched. In response, HMI 1004 may interpret this received data to determine whether to have UI 1002 display a different UI screen or to issue a command to CDM 1006. For example, HMI 1004 may determine that the user touched a portion of the touch screen corresponding to a beverage brand. In response, HMI 1004 may issue a command to CDM 1006 to pour the corresponding beverage brand. In response to receiving the command to pour the corresponding beverage brand, the CDM 1006 in turn issues commands via one or more control buses 1008 to the pumping or metering devices 1010 for the beverage ingredients needed to dispense the beverage brand. Or HMI 1004 may determine that the user touched a portion of the touch screen corresponding to a request for another screen. In response, HMI 1004 may cause UI 1002 to display the requested screen.

For example, the CDM 1006 issues commands via a control bus 1008 to the flow control module 100 in response to receiving a command to pour a selected beverage brand, as described above in conjunction with FIGS. 10-12. For example, the controller 106 may be implemented by the CDM 1006. Alternatively, the CDM 1006 may issue commands via the control bus to the controller 106 for controlling operation of the flow control module 100. Upon the HMI 1004 receiving a selection of a beverage brand, the CDM 1006 may obtain a recipe for the selected beverage from the recipe database 102. Upon the HMI 1004 receiving a command to pour the beverage (e.g., pour actuator 104 indicates an "on" status), the CDM 1006 sends a signal to a solenoid driver 108, which in turn sends a signal to the first solenoid assembly 108 such that first solenoid assembly 108 causes the flow control module 100 to flow (e.g., the on/off solenoid assembly 108 turns on and opens armature 46 so that the flow may proceed into passageway 54). Additionally, the CDM 1006 sends a signal to the solenoid driver indicating a voltage level to drive the second solenoid assembly 110 so that it releases a flow at the predetermined rate (e.g., armature 66 is acted upon by coil 58 such that it moves to allow the flow at the predetermined rate). CDM 1006 compares the predetermined flow rate with a signal from the flow meter 92, which detects the actual flow rate through the inlet orifice 24 and adjusts the voltage level to drive the second solenoid assembly 110 accordingly throughout the dispense of the beverage in accordance with the recipe.

In some embodiments, UI 1002 in beverage dispenser 804 may be utilized to select and individually dispense one or more beverages. The beverages may be dispensed as beverage components in a continuous pour operation whereby one or more selected beverage components continue to be dispensed while a pour input is actuated by a user or in a batch pour operation where a predetermined volume of one or more selected beverage components are dispensed (e.g., one ounce at a time). UI 1002 may be addressed via a number of methods to select and dispense beverages. For example, a user may interact with UI 1002 via touch input to navigate one or more menus from which to select and dispense a beverage. As another example, a user may type in a code using an onscreen or physical keyboard (not shown) on beverage dispenser 804 to navigate one or more menus from which to select and dispense a beverage. As a further example, a user may interact with the HMI 1004 via a user interface of an application on the mobile device 852.

UI 1002, which may include a touch screen and a touch screen controller, may be configured to receive various commands from a user (i.e., consumer input) in the form of touch input, generate a graphics output and/or execute one or more operations with beverage dispenser 804 (e.g., via HMI 1004 and/or CDM 1006), in response to receiving the aforementioned commands. A touch screen driver in HMI 1004 may be configured to receive the consumer or customer inputs and generate events (e.g., touch screen events) that may then be communicated through a controller to an operating system of HMI 1004.

Beverage dispenser 804 may be in communication with one or more external device (e.g., mobile device 852 or POS 854). In some embodiments, the communication between beverage dispenser 804 and the external device may be accomplished utilizing any number of communication techniques including, but not limited to, near-field wireless technology such as BLUETOOTH, Wi-Fi and other wireless or wireline communication standards or technologies, via a communication interface.

Figure 11:
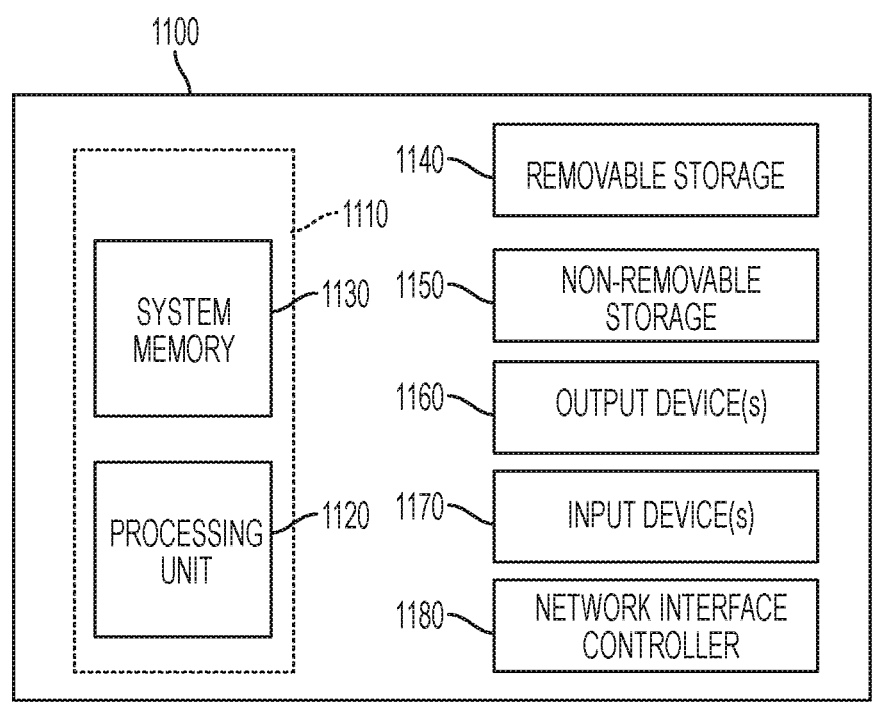
FIG. 11 is an exemplary computer system according to the teachings herein.

FIG. 11 illustrates an exemplary computer system 1100 suitable for implementing the several embodiments of the disclosure. For example, the controller 124, the solenoid driver 308, or one or more components or controller components of the beverage dispenser 804 may be implemented as the computer system 1100. In some implementations, one or both of the HMI 1004 and the CDM 1006 may be implemented as the computer system 1100.

It should be appreciated that the logical operations described herein with respect to the various figures may be implemented (1) as a sequence of computer implemented acts or program modules (i.e., software) running on a computing device (e.g., the computing device described in FIG. 11), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 11, an example computing device 1100 upon which embodiments of the invention may be implemented is illustrated. For example, each of the content source, key server, segmentations servers, caching servers, and client devices described herein may each be implemented as a computing device, such as computing device 1100. It should be understood that the example computing device 1100 is only one example of a suitable computing environment upon which embodiments of the invention may be implemented. Optionally, the computing device 1100 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In some embodiments, the computing device 1100 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some embodiments, virtualization software may be employed by the computing device 1100 to provide the functionality of a number of servers that is not directly bound to the number of computers in the computing device 1100. For example, virtualization software may provide twenty virtual servers on four physical computers. In some embodiments, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In its most basic configuration, computing device 1100 typically includes at least one processing unit 1106 and system memory 1104. Depending on the exact configuration and type of computing device, system memory 1104 may be volatile (such as random-access memory (RAM)), non-volatile (such as read-only memory (ROM), flash memory, etc.), or some combination of the two. This most basic configuration is illustrated in FIG. 11 by dashed line 1102. The processing unit 1106 may be a standard programmable processor that performs arithmetic and logic operations necessary for operation of the computing device 1100. While only one processing unit 1106 is shown, multiple processors may be present. Thus, while instructions may be discussed as executed by a processor, the instructions may be executed simultaneously, serially, or otherwise executed by one or multiple processors. The computing device 1100 may also include a bus or other communication mechanism for communicating information among various components of the computing device 1100.

Computing device 1100 may have additional features/ functionality. For example, computing device 1100 may include additional storage such as removable storage 1108 and non-removable storage 1110 including, but not limited to, magnetic or optical disks or tapes. Computing device 1100 may also contain network connection(s) 1116 that allow the device to communicate with other devices such as over the communication pathways described herein. The network connection(s) 1116 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/ or other air interface protocol radio transceiver cards, and other well-known network devices. Computing device 1100 may also have input device(s) 1114 such as a keyboard, keypads, switches, dials, mice, track balls, touch screens, voice recognizers, card readers, paper tape readers, or other well-known input devices. Output device(s) 1112 such as a printer, video monitors, liquid crystal displays (LCDs), touch screen displays, displays, speakers, etc. may also be included. The additional devices may be connected to the bus in order to facilitate communication of data among the components of the computing device 1100. All these devices are well known in the art and need not be discussed at length here.

The processing unit 1106 may be configured to execute program code encoded in tangible, computer-readable media. Tangible, computer-readable media refers to any media that is capable of providing data that causes the computing device 1100 (i.e., a machine) to operate in a particular fashion. Various computer-readable media may be utilized to provide instructions to the processing unit 1106 for execution. Example tangible, computer-readable media may include, but is not limited to, volatile media, non-volatile media, removable media, and non-removable media implemented in any method or technology for storage of information such as computer readable instructions, data structures, program modules or other data. System memory 1104, removable storage 1108, and non-removable storage 1110 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 1106 may execute program code stored in the system memory 1104. For example, the bus may carry data to the system memory 1104, from which the processing unit 1106 receives and executes instructions. The data received by the system memory 1104 may optionally be stored on the removable storage 1108 or the non-removable storage 1110 before or after execution by the processing unit 1106.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A mixing valve system, comprising:
   a first fluid inlet adapted to receive a first fluid flow;
   a first proportional control valve fluidically coupled to the first fluid inlet and adapted to dynamically adjust an amount or flow rate of the first fluid flow provided from the first proportional control valve based on a first control signal;
   a second fluid inlet adapted to receive a second fluid flow;
   a second proportional control valve fluidically coupled to the second fluid inlet and adapted to dynamically adjust an amount or flow rate of the second fluid flow provided from the second proportional control valve based on a second control signal;
   a nozzle fluidically coupled to the first and second proportional control valves and adapted to dispense a combined fluid flow comprising the first fluid flow provided from the first proportional control valve and the second fluid flow provided from the second proportional control valve;
   a thermal mass flow meter configured to communicate a first feedback signal based on a measured parameter of one of the first fluid flow, the second fluid flow, or the combined fluid flow; and
   a controller electrically coupled to the thermal mass flow meter and the first and second proportional control valves, wherein the controller is configured to generate the first and second control signals based on the first feedback signal.

2. The mixing valve system of claim 1, wherein the measured parameter is a temperature or flow rate of the first fluid flow, the second fluid flow, or the combined fluid flow.

3. The mixing valve system of claim 2, wherein the measured parameter is a temperature of the combined fluid flow.

4. The mixing valve system of claim 1, further comprising:
   a manifold fluidically coupled to the first and second proportional control valves to receive the first and second fluid flows, the manifold further fluidically coupled to the nozzle to supply the combined fluid flow.

5. The mixing valve system of claim 1, wherein the thermal mass flow meter is a first thermal mass flow meter, wherein the first thermal mass flow meter is configured to communicate a first feedback signal based on a measured parameter of the first fluid flow.

6. The mixing valve system of claim 5, further comprising a second thermal mass flow meter configured to communicate a second feedback signal based on a measured parameter of the second fluid flow.

7. The mixing valve system of claim 6, further comprising a third thermal mass flow meter configured to communicate a third feedback signal based on a measured parameter of the combined fluid flow.

8. The mixing valve system of claim 1, wherein the nozzle is configured to mix at least one additional fluid stream with the combined fluid flow.

9. The mixing valve system of claim 8, wherein the at least one additional fluid stream is a beverage ingredient.

10. The mixing valve system of claim 1, wherein the first fluid flow is a still or uncarbonated water flow and the second fluid flow is a carbonated water flow.

11. The mixing valve system of claim 1, further comprising a shut-off valve upstream or downstream from each of the first proportional control valve and the second proportional control valve.

12. The mixing valve system of claim of claim 1, wherein the measured parameter is a detection of bubbles in one of the first fluid flow, the second fluid flow, or the combined fluid flow.

13. The mixing valve system of claim of claim 1, wherein the controller communicates the first and second control signals to the first and second proportional control valves.

14. The mixing valve system of claim 1, wherein one of the first and second proportional control valves adjusts the amount or flow rate of the first or second fluid flow based on the first and second control signals to provide a desired amount or ratio of mixing between the first and second fluid flows into the combined fluid flow.

15. The mixing valve system of claim 1, wherein the first and second control signals are based on a predetermined ratio of the first and second fluid flows or a desired set point.

16. The mixing valve system of claim 15, further comprising a recipe database coupled to the controller, the recipe database comprising at least one beverage recipe having the predetermined ratio or the desired set point.

17. A method of controlling a mixing valve system, the method comprising:
   receiving, at a controller, a first feedback signal from a thermal mass flow meter, the first feedback signal based on a measured parameter of one of a first fluid flow, a second fluid flow, or a combined fluid flow;
   sending, via the controller, a first control signal to a first proportional control valve fluidically coupled to a first fluid inlet of the first fluid flow, wherein the first proportional control valve is adapted to dynamically adjust an amount or flow rate of the first fluid flow responsive to the first control signal; and
   sending, via the controller, a second control signal to a second proportional control valve fluidically coupled to a second fluid inlet of the second fluid flow, wherein the first and second proportional control valves are fluidically coupled to a nozzle for dispensing the combined fluid flow, wherein the second proportional control valve is adapted to dynamically adjust an amount or flow rate of the second fluid flow responsive to the second control signal, wherein at least one of the first control signal or the second control signal are based on the first feedback signal.

18. The method of claim 17, wherein the first feedback signal is based on a measured parameter of the first fluid flow, the method further comprising:
receiving, at the controller, a second feedback signal from a second thermal mass flow meter, the second feedback signal based on a measured parameter of the second fluid flow.

19. The method of claim 18, further comprising:
receiving, at the controller, a third feedback signal from a third thermal mass flow meter, the third feedback signal based on a measured parameter of the combined fluid flow.

20. The method of claim 17, wherein the first control signal and the second control signal are for adjusting the first proportional control valve and the second proportional control valve, respectively, to provide a desired amount or ratio of mixing between the first and second fluid flows into the combined fluid flow.

* * * * *